(12) United States Patent
Centner et al.

(10) Patent No.: US 11,620,629 B2
(45) Date of Patent: Apr. 4, 2023

(54) SENSOR DEVICE AND SYSTEM FOR COMMUNICATING INFORMATION

(71) Applicant: Highway Toll Administraton, LLC, Roslyn Heights, NY (US)

(72) Inventors: David Centner, Roslyn Heights, NY (US); Pinku Kurian, Roslyn Heights, NY (US)

(73) Assignee: Highway Toll Administration, LLC, Roslyn Heights, NY (US)

( * ) Notice: Subject to any disclaimer, the term of this patent is extended or adjusted under 35 U.S.C. 154(b) by 0 days.

(21) Appl. No.: 16/762,793

(22) PCT Filed: Oct. 22, 2018

(86) PCT No.: PCT/US2018/056928
§ 371 (c)(1),
(2) Date: May 8, 2020

(87) PCT Pub. No.: WO2019/079812
PCT Pub. Date: Apr. 25, 2019

(65) Prior Publication Data
US 2020/0302424 A1   Sep. 24, 2020

Related U.S. Application Data

(60) Provisional application No. 62/575,014, filed on Oct. 20, 2017.

(51) Int. Cl.
*G06Q 20/32* (2012.01)
*H04W 4/80* (2018.01)
*H04W 52/02* (2009.01)

(52) U.S. Cl.
CPC ..... *G06Q 20/3224* (2013.01); *G06Q 20/3223* (2013.01); *G06Q 20/3226* (2013.01); *H04W 4/80* (2018.02); *H04W 52/0203* (2013.01)

(58) Field of Classification Search
None
See application file for complete search history.

(56) References Cited

U.S. PATENT DOCUMENTS

| | | | | |
|---|---|---|---|---|
| 9,633,243 | B1 * | 4/2017 | Geist | G06Q 20/3278 |
| 2013/0090991 | A1 * | 4/2013 | Underwood | G07B 15/063 |
| | | | | 705/13 |
| 2015/0088617 | A1 * | 3/2015 | Geist | G06Q 20/26 |
| | | | | 705/13 |
| 2015/0134428 | A1 * | 5/2015 | Li | G07B 15/063 |
| | | | | 705/13 |

* cited by examiner

*Primary Examiner* — Joseph W. King
*Assistant Examiner* — Amit Patel

(57) ABSTRACT

A sensor device for conducting electronic transactions from a vehicle including a housing including an RFID circuit operably connected to an RFID antenna, a short range communication device, the RFID circuit and short range communication device operably connected to a processor, and a power supply. The sensor device is wirelessly connectable to a mobile communication device via the Bluetooth chip and the mobile communication device runs a software application. The RFID antenna is adapted to receive a wireless signal from a transmitter. Responsive to the wireless signal, the processor causes the short range communication device to wirelessly communicate with the mobile communication device to initiate a transaction.

29 Claims, 21 Drawing Sheets

```
1. ALGORITHM PART 1 - IOT SENSOR
BEGIN
    IF
        Detect(RFID field) := YES
    THEN
        FIELD_STRENGTH := Strength(RFID Field)
        IF
            FIELD_STRENGTH > MIN THRESHOLD
        THEN
            Save(Location)
            Trigger ->Controller (FIELD_STRENGTH)
        ELSE
            Ignore()
            Reset()
        END IF
    END IF
END
```

FIG. 10A

```
2. ALGORITHM PART 2 - CONTROLLER (Mobile App)
BEGIN
    IF FIELD_STRENGTH > MIN_THRESHOLD
    THEN BEGIN
        GEO_LOCATION := getGeoLocation()
        GEO_FENCES[] := getNearbyGeoFences(GEO_LOCATION)
        TOLL_PLAZA_LOC := 0
        PARK_PLAZA_LOC := 0

TOLL_PLAZA_LOC := CheckTollPlazaLocation (GEO_FENCES, GEO_LOCATION)
        PARK_PLAZA_LOC := CheckParkPlazaLocation (GEO_FENCES, GEO_LOCATION)

IF (TOLL_PLAZA_LOC = 0) AND (PARK_PLAZA_LOC = 0)
        THEN EXIT
        ELSE IF(TOLL_PLAZA_LOC <> 0) AND (PARK_PLAZA_LOC = 0)
        THEN
            Trigger->CalculateToll (TOLL_PLAZA_LOC);
        ELSE IF(TOLL_PLAZA_LOC = 0) AND (PARK_PLAZA_LOC <> 0)
        THEN
            Trigger->CalculatePark (PARK_PLAZA_LOC);
        ELSE IF(TOLL_PLAZA_LOC <> 0) AND (PARK_PLAZA_LOC <> 0)
            PATH := GetVehiclePath()
            IS_TOLL_PLAZA := IsTollPlazaInPath(PATH, TOLL_PLAZA_LOC)
            IF (IS_TOLL_PLAZA = TRUE)
            THEN
                Trigger->CalculateToll (TOLL_PLAZA_LOC);
            ELSE
                IS_PARK_PLAZA := IsParkPlazaInPath(PATH, PARK_PLAZA_LOC)
                IF (IS_PARK_PLAZA = TRUE)
                THEN
                    Trigger->CalculatePark (PARK_PLAZA_LOC);
                END IF
        END IF
    END IF
END
```

FIG. 10B

```
3. ALGORITHM PART 3 - CalculateToll (Mobile App)
BEGIN
    VEHICLE_TYPE:= getVehicleType()

SPEED= getCurrentSpeed ()
    LANE_TYPE = evaluate_Lane(SPEED, VEHICLE_TYPE)

DATETIME := getCurrentTime
    WEEKDAY := getWeekDay (DATETIME)
    HOUR:= getHour(DATETIME)

TOLL_PLAZA := getTollPlaza (TOLL_PLAZA_LOC)
    TOLL_RATE_TYPE := CASH
    TOLL_RATE := getTollRate (TOLL_PLAZA.ID, WEEKDAY, HOUR, TOLL_RATE_TYPE,VEHICLE_TYPE, LANE_TYPE)
    TOLL_AMOUNT := CalculateToll (TOLL_RATE)

RETURN (TOLL_PLAZA.NAME, DATETIME, TOLL_AMOUNT)
END
```

FIG. 10C

```
4. ALGORITHM PART 4 - CalculatePark (Mobile App)
BEGIN
    VEHICLE_TYPE := getVehicleType ()
    DATETIME    := getCurrentTime ()
    WEEKDAY     := getWeekDay (DATETIME)
    HOUR        := getHour (DATETIME)
    PARK_RATE_TYPE := CASH PARK_PLAZA := getTollPlaza (TOLL_PLAZA_LOC)

IF (PARK_PLAZA.RATETYPE = HOURLY)
        ENTRY_TIME := getEntryTime ()
        IF (ENTRY_TIME IS NULL)
            ENTRY_TIME  := DATETIME
            SaveEntryTime(ENTRY_TIME, PARK_PLAZA)
            EXIT
        ELSE
            EXIT_TIME := DATETIME
            PARK_RATE := getParkRate (PARK_PLAZA.ID, WEEKDAY, HOUR, PARK_RATE_TYPE, VEHICLE_TYPE, ENTRY_TIME, EXIT_TIME)
            PARK_AMOUNT := CalculatePark (PARK_RATE)
        END IF
    ELSE IF (PARK_PLAZA.RATETYPE = FIXED)
        PARK_RATE := getParkRate (PARK_PLAZA.ID, WEEKDAY, HOUR, PARK_RATE_TYPE, VEHICLE_TYPE)
        PARK_AMOUNT := CalculatePark (PARK_RATE)
    END IF

RETURN (PARK_PLAZA.NAME, DATETIME, PARK_AMOUNT)
END
```

FIG. 10D (1) Core.
(3) and (4) Approach
(2) and (5) Departure (1) Core.
(2) and (3) Guard (1) Core.
(2) and (3) Guard (1) Core.
(2) and (3) Guard

| | |
|---|---|
| If one has a list of geofences (coordinates) as show:<br>• (30, 40)<br>• (5, 25)<br>• (10, 12)<br>• (70, 70)<br>• (50, 30)<br>• (33, 45) | |
| • It starts with (30, 40). The second location (5,25) is compared with first location (30,40)<br>• The x coordinate of (30, 40) is compared with x coordinate of (5, 25). Here 5 < 30, so the coordinate (5,25) comes on the left-hand side of (30,40) | (30, 40)<br> /<br>(5, 25) |
| • Next, one takes the third coordinate (10, 12) and compares the x coordinate of (30,40). Here 10 < 30, so coordinate (10, 12) comes on the left-hand side of (30,40). Again, compare the y coordinate of (10, 12) with (5, 25). Here 12 < 25. So, coordinate (10,12) comes on the left-hand side of (5, 25). | (30, 40)<br> /<br>(5, 25)<br> /<br>(10, 12) |
| • Next coordinate is (70, 70). Compare the x coordinate of (30, 40) with the x coordinate of (70, 70). Here 70 > 30, so coordinate (70, 70) comes on right hand side of (30, 40) | (30, 40)<br> / \<br>(5, 25) (70, 70)<br> /<br>(10, 12) |
| • Consider the coordinate (50, 30). Compare x coordinate of (30, 40). Here 50 > 30, so coordinate (50, 30) comes on the right-hand side of (30,40). Again, compare the $y$ coordinate of (50, 30) with $y$ coordinate of (70, 70). Here 30<70, so coordinate (50, 30) comes on the left-hand side of coordinate (70, 70) | (30, 40)<br> / \<br>(5, 25) (70, 70)<br> / /<br>(10, 12) (50, 30) |
| • This repeats for the rest of the coordinate which will result in the below tree structure. | (30, 40)<br> / \<br>(5, 25) (70, 70)<br> / /<br>(10, 12) (50, 30)<br> /<br>(50, 30) |

FIG. 18

SENSOR DEVICE AND SYSTEM FOR COMMUNICATING INFORMATION

This application claims priority based on an International Application filed under the Patent Cooperation Treaty, PCT/US2018/056928, filed Oct. 22, 2018 and to U.S. Provisional Patent Application Ser. No. 62/575,014 filed on Oct. 20, 2017, the contents of both applications are incorporated by reference herein in their entirety.

FIELD OF THE TECHNOLOGY

The present disclosure provides a sensor and system for sensing a signal and communicating information over a mobile communication device to complete a transaction from a vehicle. More particularly, a system and method is provided including a sensor disposed in a vehicle in communication with a mobile communication device running a software application.

BACKGROUND

The use of electronic toll collection systems is becoming evermore popular as a way of managing traffic volume through toll collection points. Such systems typically include a reader at the toll station or plaza which interrogates a wireless payment device located on a vehicle. The payment device may be a transponder, such as an RFID (radio frequency identification device) or optical camera. Upon interrogation by a reader, the transponder emits a radio frequency signal that includes information corresponding to an account code unique to the transponder and/or vehicle. Therefore, the user can be properly charged for going through the toll. Such transponders are marketed by Mark IV Transportation Technologies Group and TransCore. The transponders operate with toll collection systems such as E-ZPASS® and SunPass®. In order to function properly, the transponder must be in radio frequency ("RF") communication with the interrogator. If this communication is interrupted, the transponder will not be acknowledged. Therefore, the transponder is typically located on the windshield or other part of the vehicle where it is unobstructed by the metal body of the vehicle. Such transponders only communicate directly with the toll authority's system. Therefore, the transaction must be processed in the manner dictated by the toll authority.

However, under the currently technology there are various challenges in the tolling industry. Travelers using a rental car who utilize automated tolling services must wait days/sometimes weeks to receive complete toll information in order to make toll payments and submit expenses to their employers. For a private car driver while travelling across various states/out of their toll region, the toll payment mechanism is not uniform. Therefore, paying tolls is a challenge when the user is outside of their state/region. There is also a delay in posting the tolls due to the technology and infrastructure limitations introduced by the toll agencies.

Furthermore, in most cases, toll-related expenses are not captured in travel-related expense submissions, therefore, they must be manually gathered and submitted. Often, employees simply shoulder the cost, as they just do not possess the time to be bothered with theses tedious manual tasks.

In addition, geofenced-based mobile tolling solutions suffer from performance issues with regard to power consumption and the inability to work under certain circumstances such as urban densities, atmospheric conditions, toll lane proximity to non-toll lanes, etc. Geofenced-based mobile tolling solutions suffer from the inability to provide real time tolling feedback due to their inherent requirement of one or more "fences" per toll facility. A geofence is at best an area of certain dimensions surrounding a toll facility, not directly pointing to it. This leads to tolls recorded and registered before or after the toll facility. Oftentimes, multiple fences per toll facility are required to achieve certain confidence levels, which can exacerbate the inability to provide real time tolls.

License plate image-based mobile tolling solutions also suffer from inherent delays in the posting of tolls, often several days or more. Conventional tolling systems are expensive and time consuming due to engineering and equipment requirements at the toll facility.

Moreover, toll roads are moving toward cashless lanes as a means of decreasing operating costs. There is currently no simple method to pay tolls and submit reimbursements for toll expenses to employers.

Accordingly, it would be desirable to provide a system for tracking vehicles through a toll station or other vendor locations and gathering and organizing transaction information incurred and communicating information to the customer expeditiously so that the customer is made aware of the charge contemporaneous with the charge being incurred.

SUMMARY

The present disclosure provides, a sensor device for conducting electronic transactions from a vehicle including a housing including an RFID circuit operably connected to an RFID antenna, a short range communication device, the RFID circuit and short range communication device operably connected to a processor, and a power supply. The sensor device is wirelessly connectable to a mobile communication device via the Bluetooth chip and the mobile communication device runs a software application. The RFID antenna is adapted to receive a wireless signal from a transmitter. Responsive to the wireless signal, the processor causes the short range communication device to wirelessly communicate with the mobile communication device to initiate a transaction.

The present disclosure also provides a system for making electronic payments including a sensor device including a processor and an RFID circuit operably connected to an RFID antenna, a Bluetooth chip operably connected to the processor, and a power supply. The sensor device is wirelessly connected to a mobile communication device running a software application. The sensor device is adapted to receive a wireless signal from a transmitter of a vendor. Responsive to the wireless signal, the sensor wirelessly communicates with the mobile communication device to initiate a transaction. The software application causes the mobile device to communicate wirelessly via a communication network with a system administrator to complete a transaction and to send a signal to the mobile communication device that a transaction has occurred.

The present disclosure further provides a method of conducting a transaction from a vehicle including:

providing within a vehicle a sensor device including a processor and an RFID circuit operably connected to an RFID antenna, a Bluetooth chip operably connected to the processor, and a power supply;

providing a mobile communication device running a software application, the sensor device being wirelessly connected to the mobile communication device;

the sensor receiving a wireless signal from a transmitter of a vendor;

responsive to the wireless signal, the sensor wirelessly communicating with the mobile communication device to initiate a transaction;

the software application causing the mobile device to communicate wirelessly via a communication network with a system administrator to complete a transaction; and system administrator sending a signal to the mobile communication device indicating that the transaction has occurred.

BRIEF DESCRIPTION OF THE DRAWINGS

FIGS. 10A-D are rate calculation algorithms.

FIG. 18 illustrates a KD Tree based custom algorithm in accordance with some embodiments.

DETAILED DESCRIPTION

Figure 1:
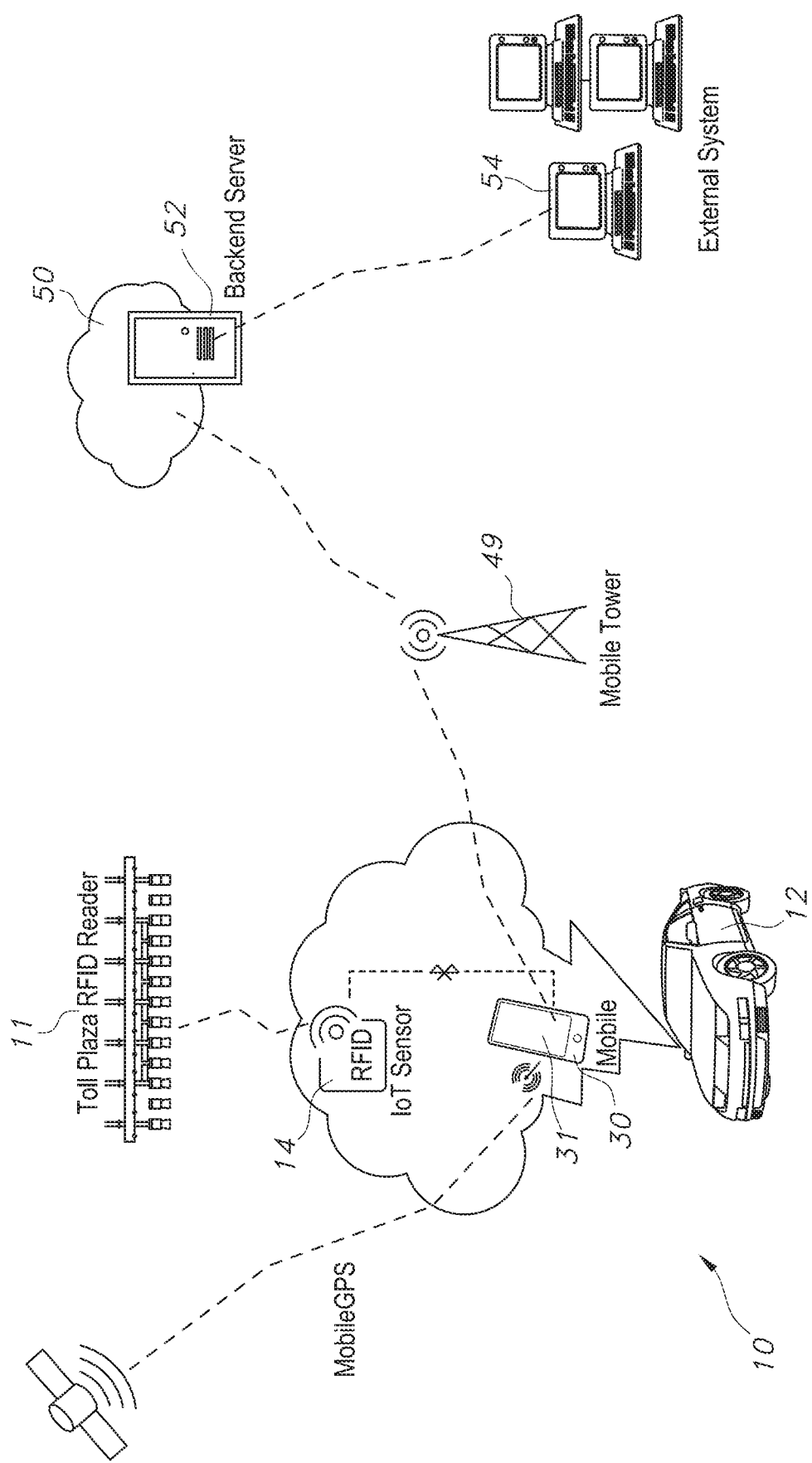
FIG. 1 is a diagram of a system of the present disclosure.
Figure 2:
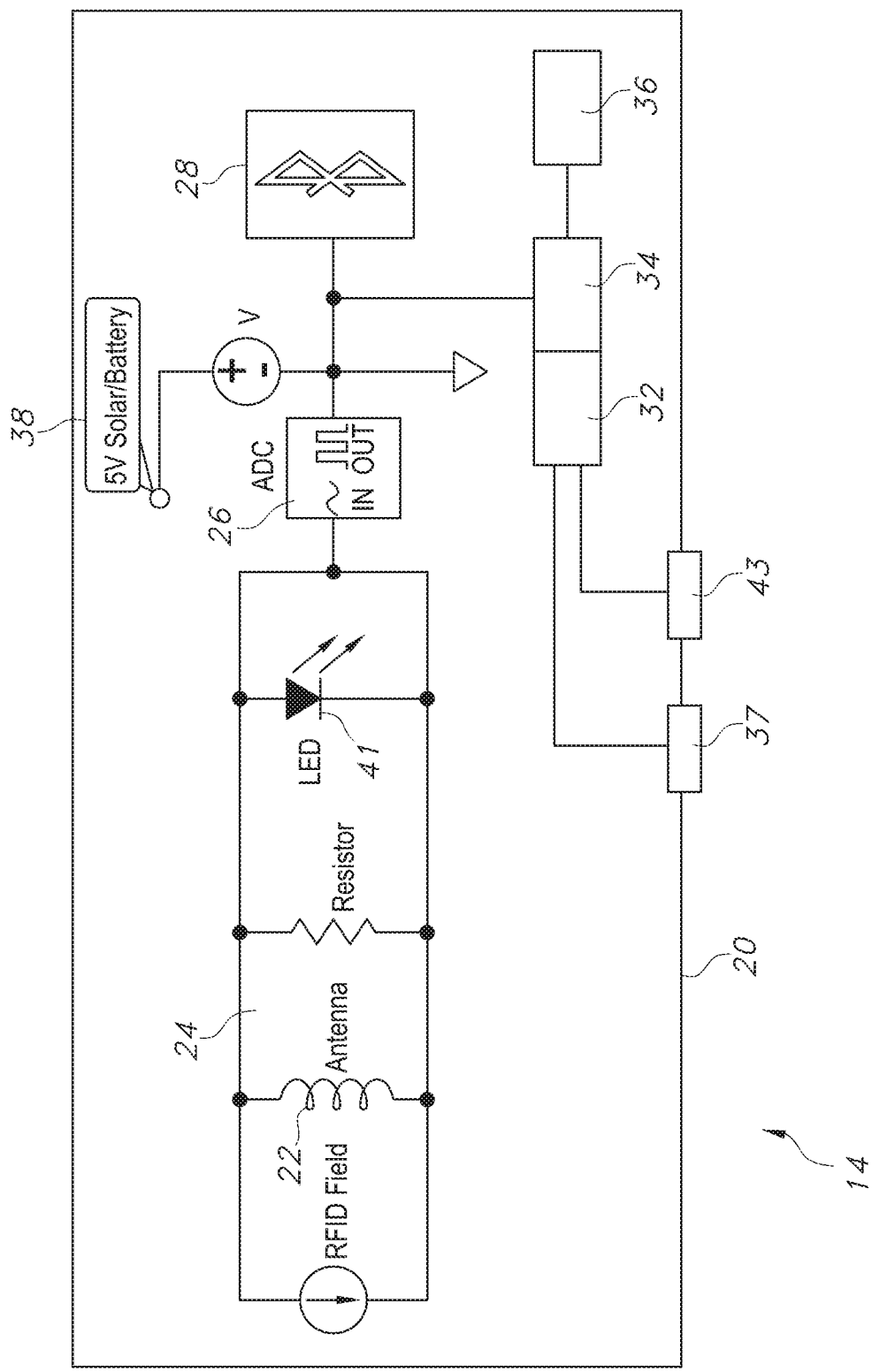
FIG. 2 is a schematic of a sensor device of the present disclosure.

With reference to FIGS. 1 and 2, the present disclosure is directed to a system 10, which assists in conducting transactions incurred in or through use of a vehicle 12. The system 10 includes a sensor device 14 positioned within a vehicle 12 which integrates communication technologies such as RFID with BlueTooth Low Energy ("BLE"). The sensor device 14 connects with a mobile communication device 30 for purposes of providing accurate, near real-time toll processing and value-added services to drivers. The system 10 also creates an alternative toll payment mechanism as an alternative to traditional transponder-based implementations. The system 10 may also create an alternative, more efficient payment mechanism for other vendors such as gas stations, mileage tracking, parking, drive-through restaurants, etc.

Current tolling systems require costly and time-consuming deployments. At a minimum, toll gantries are constructed, specialized transponder readers are installed along with camera equipment. Additionally, when a customer opens an account with the toll authority, there is extra labor and materials involved because each transponder must be uniquely encoded to the customer's account.

The present system 10 of this disclosure contemplates the use of "dumb" sensors 14 that potentially can be freely distributed to new customers (or customers with new vehicles). At the roadside, rather than installing specialized transponder readers, with this sensor device 14 one only needs to install only radio frequencies transmitters the toll facility 11 operating in concert with the frequency of the sensor device 14. The mobile communication device 30, once paired with the sensor device 14, captures the toll incident when the sensor device 14 is activated by the frequency transmitted at the toll facility 11. In effect, the driver via their mobile communication device 30 is informing the tolling authority that the toll has transpired.

With reference to FIG. 2, the sensor device 14 may include a housing 20 including an antenna 22 such as an RFID antenna (915 MHz) chip which detects an RFID signal. The sensor device 14 may include a passive RFID circuit 24 operably connected to the antenna. The sensor device 14 may also include a signal converter 26 such as an analog to digital converter (ADC) chip. The Analog-to-digital converter (ADC) converts an analog signal, such as current or voltage, into a digital signal. The sensor device 14 may also include a signal indicator 41 in the form of a light-emitting diode (LED) such as a two-lead semiconductor that emits light when activated. The sensor device 14 may further include a communication element 28 such as a BLE chip capable of emitting a BLE signal. The BLE chip 28 may be compatible with all standard BLE chips used in iPhone® and Android® devices. The BLE signal may be received by a nearby mobile communication device 30, such as a smartphone, tablet, laptop or other mobile device having communication abilities. The signal may be encrypted for security purposes. The indicator 41 may be used to display a status such as BLE paring. The sensor device 14 may further include a processor 32 such as a microcontroller chip containing one or more processor cores along with memory 34 and programmable input/output peripherals 36. The sensor device 14 may include a power supply 38 in the form of a battery and/or solar panel for powering the BLE. The sensor device 14 may also include a switch 43 to change the sensor between a high and low power mode. The switch 43 may be in the form of a smart touch switch operably connected to the processor 32.

The sensor device 14 may have encoded in memory a unique digital identification number (DID) preferably assigned by the sensor device manufacture or provider. This DID is used to help track the origin of any transaction initiated by the sensor device 14.

Figure 3:
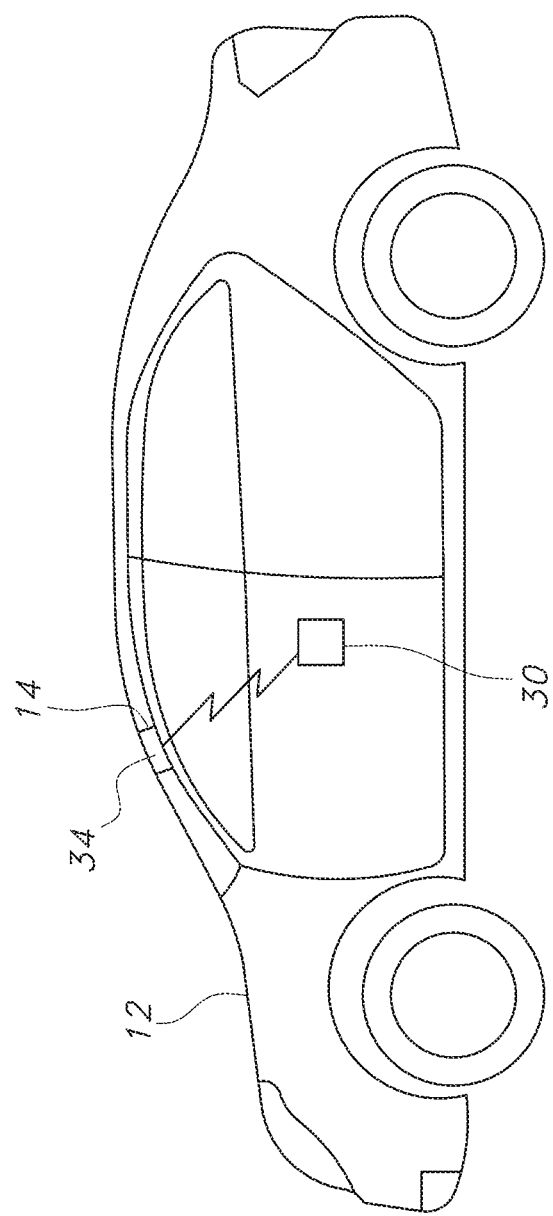
FIG. 3 is a schematic of a vehicle with a toll sensor of the present disclosure and mobile communication device.

With reference to FIG. 3, the sensor device 14 may further include a mount 39 which may be in the form of an adhesive securable to a vehicle's windshield. Then on the windshield the sensor device is good position to receive signal from outside the vehicle. The sensor device 14 may be designed to withstand the severe extremes of environment typically found within a motor vehicle.

The sensor device 14 may also include an input device 37 such as a button operable by a user. The input device 37 may be operably connected to the processor to affect the operation of the sensor device 14. The input device 37 can be used for various functions such as starting and stopping a trip or journey for measuring mileage as will be further described below.

Figure 4:
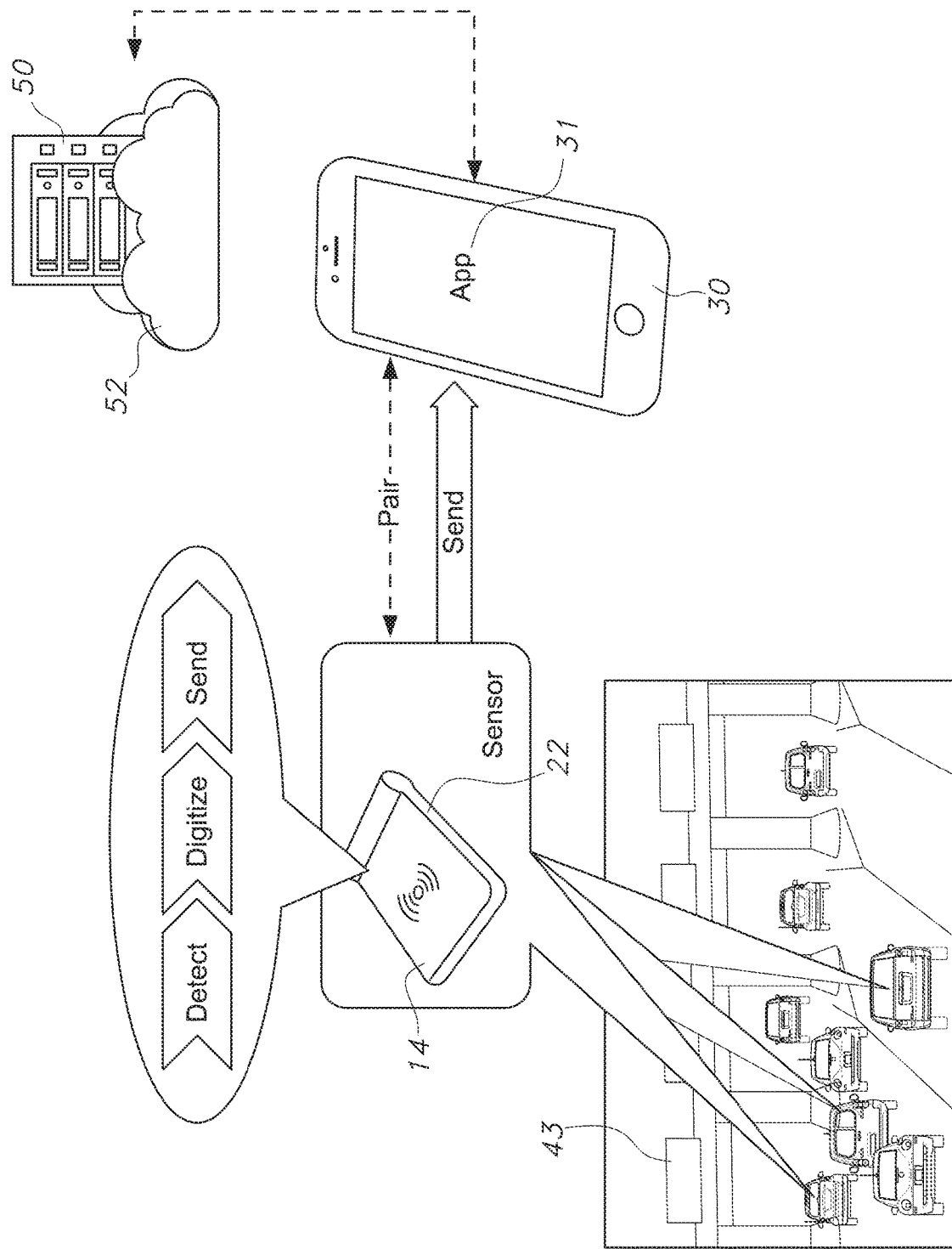
FIG. 4 is a schematic of toll payment processing components of the present disclosure.

With reference to FIG. 4, the sensor device 14 using antenna 22 is able to sense an interrogation RFID signal generated from an extra vehicle source such as in a toll area 43 having a toll gantry or a toll plaza. In response to the received RFID signal the sensor device 14 device may communicate with the mobile communication device 30 using the BLE chip. The mobile communication device 30 may be running a software application 31 that is responsive to such a communication as will be further described. If the mobile application is not available, the sensor device 14 can store data temporarily in memory 34 and send the data to the software application 31 once the BLE connection to the mobile communication device 30 sensor device 14 running the software application 31 is re-established.

In one embodiment the system 10, uses the sensor device 14 in combination with a mobile communication device 30 running software application 31 to allow for accurate detection of a toll event, and the calculation of the toll, through the use of algorithms, in near real-time. This enables the user to pay the toll fees and submit the toll expenses very quickly. This provides the user with the payment event contemporaneous with the travel through the toll area and facilitates the tracking and expensing of such payments.

With reference to FIGS. 1 and 4, the application software 31 running on the mobile communication device 30 communicates via a wireless cellular network with a system administrator 50. The system administrator 50 may include a plurality of servers, processors and databases which can receive, transmit, track and calculate payments. The system administrator 50 may have a backend 52 which may be cloud based which acts as in interface between the mobile communication device 30 and the system administrator 50. The system administrator 50 may also communicate with and coordinate with toll authorities systems 54. The toll authorities act as vendors charging fees for use of the transportation facilities. Based on the information received from the mobile communication device 30, including, for example, the vehicle's location, the system administrator can determine the toll amount and generate a charge to the user in near real time. The information does not need to first travel through the existing system of the toll collecting authority. The system administrator 50 can instead collect the fee for the toll from the user and pay the toll authority at a later time. With the system 10 in operation, a user does not have to wait to pay the fee and receive a receipt until a toll authority and/or any intermediary billing agency to process the toll transaction and issue the invoice.

As noted above, the sensor device 14 may operate in conjunction with the software application 31 to provide the functionalities and advantages of system 10 to the user. In order to initiate use of the system 10, a user may install the sensor device 14 in a vehicle 12 and download the software application 31 on their mobile communication device 30 in a conventional manner. A user would then open the software application to set up an account and to register the particular sensor device 14 and/or vehicle license plates. This could be done for both rental and private vehicles. Registration of the sensor device 14 could be accomplished by entering an identification number in a prompted field or by pairing the sensor device 14 to the communication device in which case the digital identification number would be transmitted wirelessly from the sensor device 14 to the mobile communication device 30. With the sensor device 14 installed and the software application loaded, the user may then pair the sensor device 14 to the mobile communication device 30, such as a phone. When the vehicle enters the toll area 43, the sensor device 14 emits a BLE signal to the phone and software application running thereon. The application 31 verifies that is it a valid toll plaza using stored geofence information. The application 31 causes the phone 30 to contact the system administrator 50 for processing of the toll.

The software application 31 when configured by the user, permits a user to generate a full report for their tolling and other payment transactions such as paid parking activities where the system could then provide journey reports, receipts, and send alerts/notifications whenever tolls were incurred. The software application may also generate reports such as vendor, amount charged, amount paid, location and time of transaction. The software application may also provide analytics with map view for the user.

The system 10 streamlines the submittal of toll or other expenses for reimbursement to the user. This may be achieved by deep integration between the application software 31 with expense management systems such as Concur®, Amex®, Certify®, etc., allowing the export of such expenses directly into a business traveler's reimbursement system.

Further details of the software components will now be described. A secured connectivity is established between the sensor device 14 and the mobile software application 51 installed on user's mobile communication device 30. The sensor device 14 may use BLE for connectivity to the mobile software application 31. The user, either a consumer or a car rental customer, after downloading the software mobile application 31 onto their mobile device 30 may then follow instructions for setting up an account. Each sensor device 14 may have a unique name and number to identify and connect using Bluetooth. The software may also guide the user through the pairing. Following are the steps for pairing.

1. Switch on the sensor device 14. This will also Turn Bluetooth ON and make the sensor discoverable. The LED on the sensor may start flashing.

2. Turn on the Bluetooth in mobile device 30.

3. Open the mobile software application 31, as this will automatically discover the sensor device 14 BLE and connect for listening. Alternatively, the user may select the sensor device 14 from a list of available devices.

4. The sensor device 14 and the mobile software application will now be connected. The indicator light 41 may then turn off.

If the user is in a car rental situation, the software application may then register the rental car to the user.

With the sensor device 14 paired to the mobile communication device 30 running the mobile software application 31, the system 10 can now detect the presence of a toll plaza tolls or other vendor emitting an RFID signal. This can be achieved using either an online mechanism or an offline mechanism.

Figure 5:
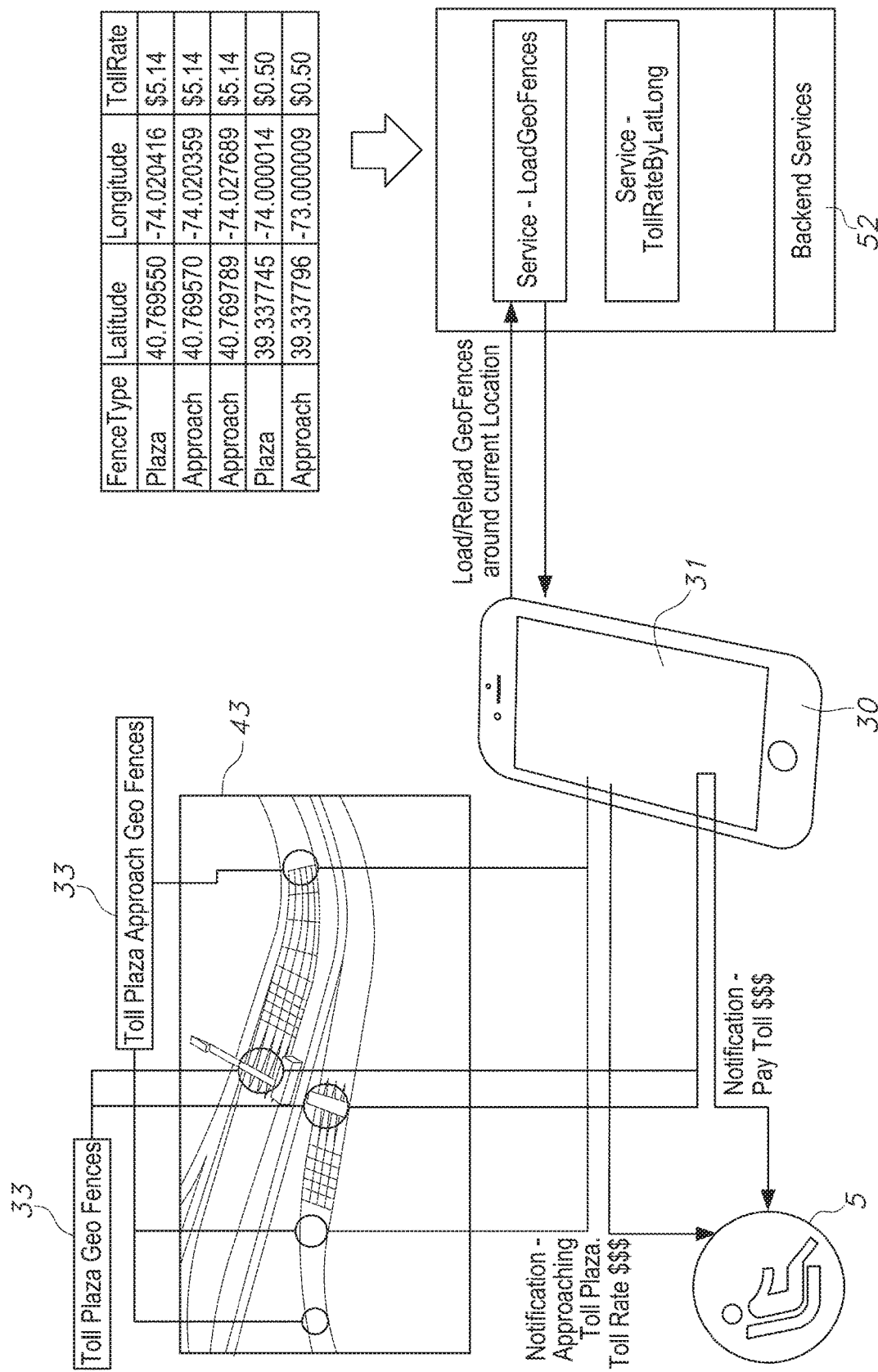
FIG. 5 is a diagram of an online toll processing mechanism.

With reference to FIG. 5, for the online mechanism, the software application 31 is either launched by the user prior to a toll event or the software application is running in the background. Once launched, the software application 31 is "always on" and waiting to pair with the sensor device 14 when they are in close enough proximity.

Step 1: Software application may use geofences 33 to inform drivers 5 they are approaching a toll plaza 43. In an alternative embodiment, the sensor device 14 will detect the RF signal emitted by the toll plaza 43 and immediately communicate with the mobile communication device 30 alerting of the upcoming tolling station.

Step 2: As the vehicle passes through the toll RFID gantry of the toll plaza, the sensor device 14 will notify the mobile communication device 30 and the software application will plot the exact geo location, speed, network etc. The mobile communication device will then initiate a call out over an existing communication network to the system administrator's backend 52 cloud-based service.

Step 3: The system administrator backend computes the toll amount using the toll rates and applicable algorithms.

Step 4: Geofences before and after toll locations may be deployed as well as an additional means of confirming toll events.

Figure 6:
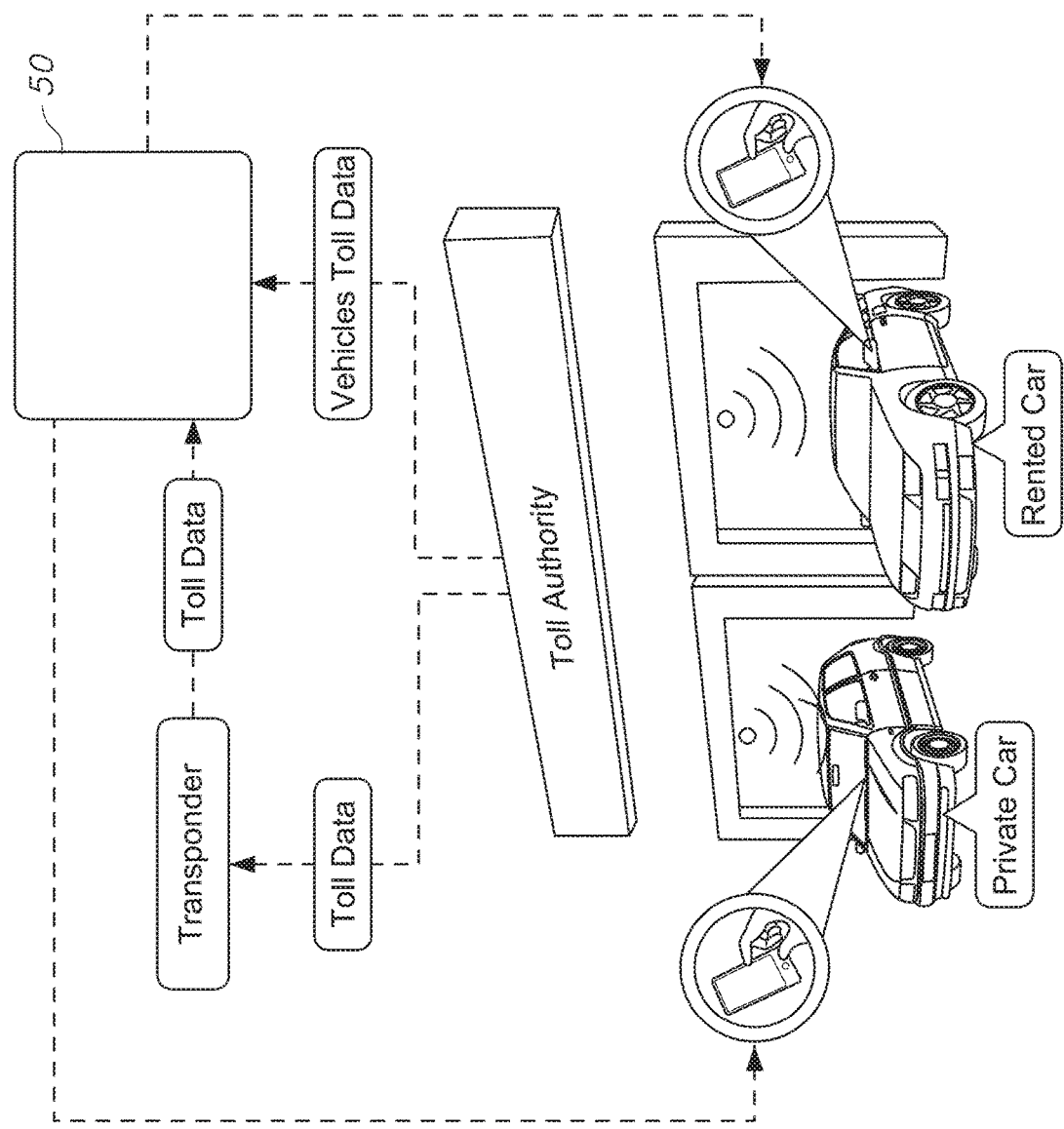
FIG. 6 is a diagram of an offline toll processing mechanism.

With reference to FIG. 6, for the offline mechanism the following steps are followed:

Step 1: Check if the driver's mobile communication device 30 is offline or driver did not sign up for software services.

Step 2: The toll administrator 50 will receive details surrounding toll transactions directly from the toll authority via conventional license plate image processing. The license plate may be preregistered by either with the toll administrator or driver's own account with the toll authority.

Step 3: The system administrator 50 will do backend reconciliation logic to match the toll to specific vehicles. The system administrator 50 will ascertain those tolls without a corresponding toll event as recorded by a sensor device 14 (offline toll transactions). That is, tolls for which no toll information was transmitted by a sensor device 14 and its companion mobile communication device 30.

Step 4: The toll administrator will gather these offline toll transactions and push the new toll event to the user's mobile software application 31. This will advise the user that a toll was incurred and the fee required to be paid.

Alternatively, when the sensor device 14 is not connected to the mobile device when traveling through a toll plaza, the sensor device 14 will still be activated upon receiving the RF signal from the toll plaza. The sensor device 14 will attempt to establish a connection with the mobile communication device 30. If such connection is not established, the sensor device 14 will store the following pertinent information in its memory such as time, awake status, detected radio frequency, and the unique identification of the sensor device 14. This information will then be sent to the mobile communication device 30 as soon as there is a reconnection between the mobile communication device and the sensor device 14. The communication device will then send the information on to the system administrator 50 for processing.

In order to prevent erroneous toll charges, if the sensor device 14 has not been paired to a mobile device it will not store or transmit any information.

The system 10 is also operable even if the mobile software application is offline. In this case, the toll authority's license-plate image capture mechanism will engage, and update the traveler's account with the system administrator 50 reconciling with the toll information provided from the toll roads. The system administrator backend systems 52 may integrate over servers with toll authorities' systems and share vehicle data to reduce the time and effort required for video tolling event/verification process. Through the integration of the system administrator and the toll authority, the system administrator can determine that the plate belongs to one its register users. The system administrator's servers can then communicate with the user's mobile communication device 30 providing the toll fee information.

The system 10 may also have a check feature to ensure that only proper toll charges are incurred. If the sensor device 14 is activated by an RF signal outside of a toll plaza, the sensor device 14 may emit a visual signal, such as a red LED indicator. The sensor device 14 may also communicate with the software application on the mobile communication device 30 and transfer such information as the time, the awake status, and the detected RF frequency. The software application can determine if the request is valid using local geo-fencing and GPS.

The sensor devices' firmware may be updatable via a wireless communication between the mobile communication device 50 and the sensor device 14. The firmware may include an interface that can be updated periodically through a firmware update to support future partners.

The system 10 is further enabled to consume less power than standard geofence-based mobile toll solutions because the GPS feature of the mobile communication device does not need to be constantly activated. The present system 10 resolves the "always on" requirement of geofence-based mobile tolling solutions. Unlike other GPS-based solutions (like Google Maps), "while using the app" is not a viable option for these tolling solutions because that mandates the software app is always running front and center. Users can be expected to use other apps and services, like making a simple phone call, which would effectively turn off the tolling solution. Therefore, "always on" for Location Services is the only viable the option, which effectively leaves the software application and location services persistently on even when the user is not in their vehicle.

The system 10 may be used in conjunction with existing camera equipment at a tolling facility that capture images of all vehicles as they pass through the toll facility. The camera equipment will capture images of all vehicles that pass through the toll facility, and will automatically have their license plates OCR'd with an accompanying time stamp. The system administrator's server then compares a master list of toll events with toll events as captured by the sensor device 14. This determines which vehicles had sensor devices 14 and which did not. Those toll incidents where there was no sensor device 14 present then proceed to determine if the plate was preregisted with an established account, or for DMV lookup if not. Toll collection for these transactions proceeds in the conventional manner.

The system 10 further includes toll aggregation technology and removes duplicate tolls. There are two methods for retrieving a user's toll data, file-based and web service-based. The first is a File-Based Retrieval/Integration. In this method, the system 10 can obtain a formatted file from toll authorities. An ETL system or ESB may be utilized for file processing, which will upload the toll data. The system 10 will then aggregate and match the tolls.

The second method is a Web Services Retrieval/Integration. In this method, the toll authorities can use the SOA service to send toll data directly to the toll administrator 50 or the toll authorities can directly host web services, where the system 10 would invoke them. This method would use an ESB for service orchestration and toll data validation. The toll administrator 50 will then aggregate and match the tolls.

Figure 7:
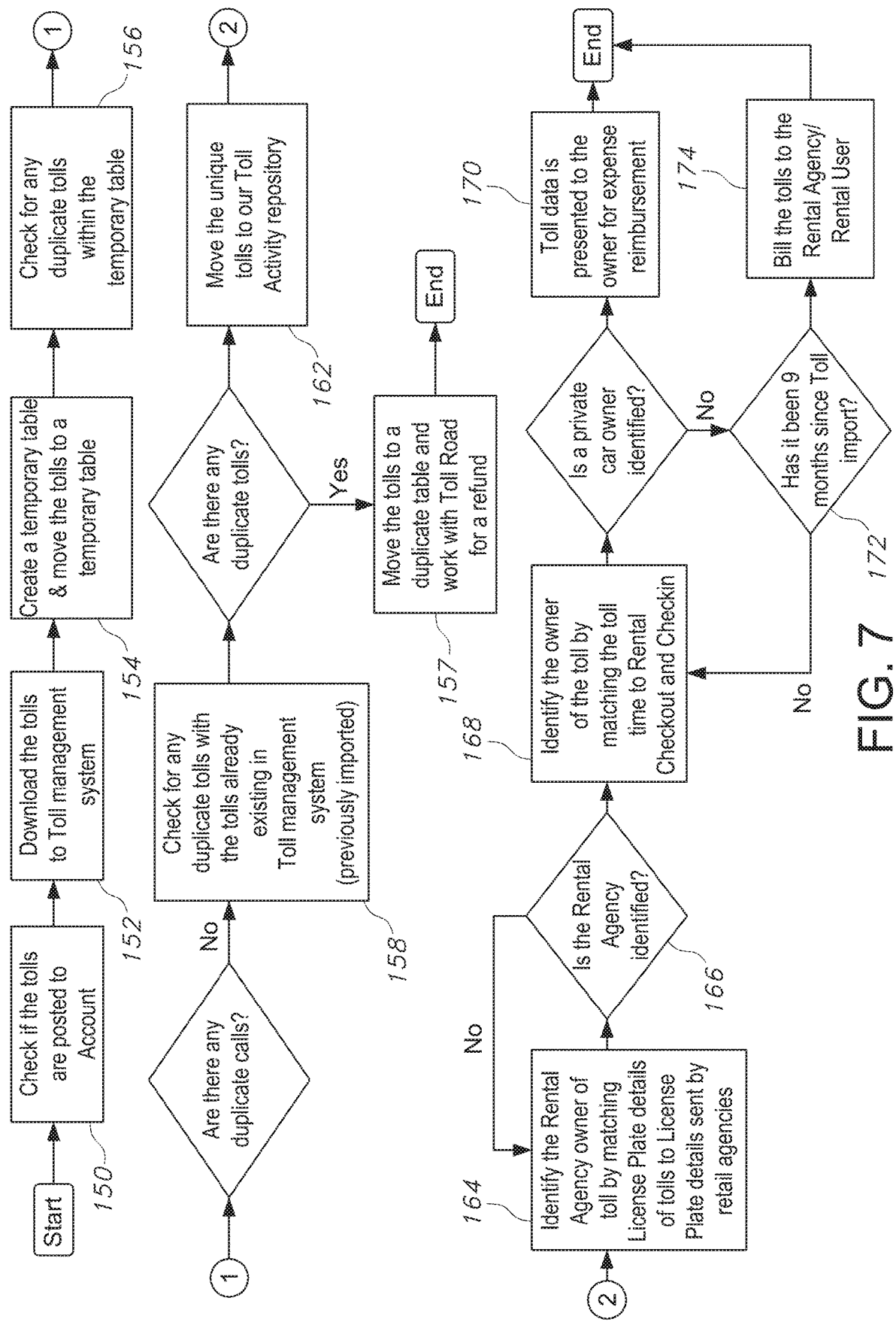
FIG. 7 is a toll aggregation flow chart.

With reference to FIG. 7, once toll charges are imported into the system administrator database 74, a matching algorithm running on the system administrator server would be initiated in order to match the toll charge with the user. The toll matching may begin by the server initiating a check to see if the tolls are posted to an account 150. If so, the toll information is downloaded to the system administrator database 152. A new temporary table is created and the toll information is moved to a temporary table 154. A check is initiated to determine if there are any duplicates in the temporary table 156. If there are none, a check is made for duplicate toll with the tolls already in the system administrator server database 158. If duplicates are identified, the duplicate tolls are moved to a duplicate table and a process can be initiated with the toll road for a refund as necessary 157. Non-duplicates are moved to a toll activity repository 162. The rental agency owner of the toll charge is identified by matching either the license plate details or a transponder ID of each toll charge to the license plate details sent by the rental agency 164. This step may be repeated until the rental agency is identified 166. The owner of the toll charge, i.e., the individual who rented the vehicle, is identified by matching the vehicle with the toll time in between the rental checkout and check in time 168. If a predetermined time period has expired, e.g., 9 months, and the owner of the toll charge has not been identified 172, then a bill for the tolls may be sent to the rental agency 174. If a private car owner is identified, the toll data is presented to the owner for expense reimbursement 170. If not, the prior identity step is repeated.

The system 10 may further include a customer push notification for new toll events. This enables a user to receive a notification on their mobile communication device 30 when a toll event occurs. The software application in communication with the toll administrator will display to the user the toll details, amount and options to pay or submit for expense reimbursement. There are multiple push notifications that the user will receive, keeping the journey more interactive. When a toll event happens, the user may receive a notification reporting the toll and the amount changed. While a vehicle arrives at a toll plaza, the notification can alert the driver that they are approaching a toll and advise the name of the toll authority and the amount to be charged.

The software application 31 may have a payment feature that provides a convenient method to pay using a mobile device. To provide users the comfort of secured payment, the software application may use existing payment protocols such as Apple Pay® or Android Pay® for processing payments. The software application 31 may display the fee(s) to be paid, and the user may select the fee to pay and authorize payment though a user established payment protocol.

Figure 8:
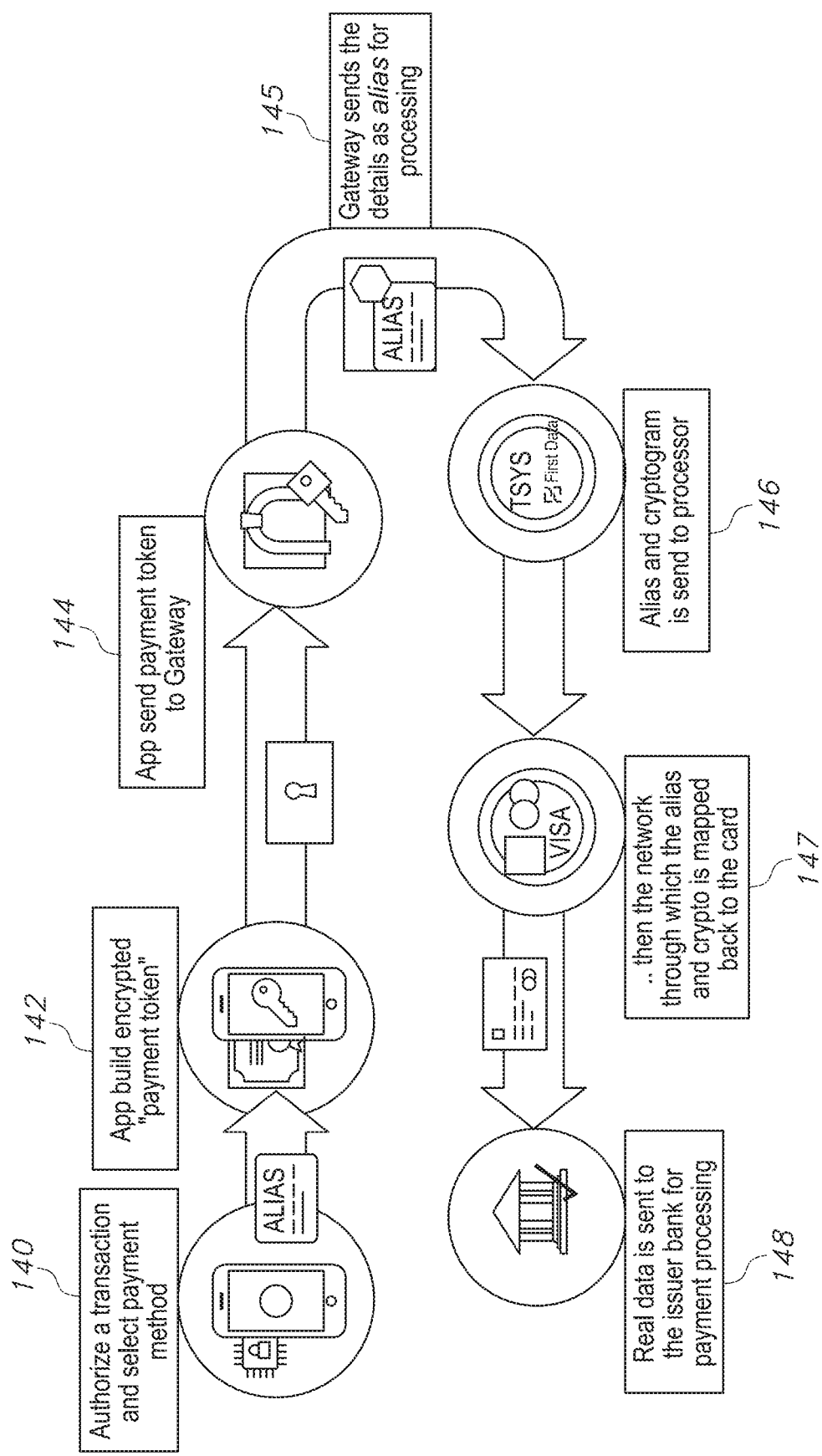
FIG. 8 is a payment processing flow chart.

The payment processing may be done through a secure payment processing mechanism of the toll administrator. The high-level payment processing flow is described in FIG. 8. The user using the software application may authorize a transaction and select a payment method 140. The software builds an encrypted payment token 142 and sends the token to a gateway 144. The gateway sends the details as an alias for processing 145. The alias and end cryptogram are sent to a processor 146. The network through which the alias and cryptogram is mapped back to the payment method, e.g. a credit card 147. Real data is sent to the issuer bank for payment processing. 148.

The system 10 permits the user to efficiently make expense reimbursements and submit expense reimbursements. Once the toll and/or parking fee is paid, the software application will provide the user an option to submit the payment(s) for expense reimbursement. The user will be shown the list of charges incurred during the trip. The user may choose to select all or some of the charges for submission as expense. The selected charges may be added to a digital invoice. The user can then initiate the submission of the invoice to the chosen expense management portal with appropriate details such as client code or job code, etc. This information is sent from the mobile device 30 over the communication network 49 to the system administrator 50, which will integrate the information with other expense management portals (Concur®, Amex®, etc.) and submit the expense on the user's behalf. In this way, the user can timely submit the expenses and not have to wait for the changes to be received at a later date and then reconstruct the data for submission.

The system 10 may also calculate rates using a Rate Calculation Algorithm. The rate calculation algorithm considers multiple factors and parameters for calculating the toll amount for a particular toll event. The system 10 may use a GeoFence Path, which is the path taken by the vehicle while travelling through or around a toll plaza. The predefined geofences will identify the plaza location, while the plotting of the GPS route will define the path that the vehicle has taken. The exact toll will depend on the lane taken by the vehicle while travelling through the toll plaza. In addition, a vehicle may travel around the toll plaza without going through the plaza (no tolls).

The system 10 may also include an algorithm that uses an RFID sensor to identify the presence of the toll plaza. For further clarification, if the vehicle is in a neighboring lane that does not charge tolls, the sensor device's antenna will not be activated.

Another parameter is the vehicle's speed, i.e. the speed at which a vehicle is moving while passing the toll plaza. The speed helps identifying if the vehicle is taking an express lane, for example, or other useful data.

A further parameter is the day and date of the toll event. The toll rate may be different for weekdays, weekends, holidays, etc.

In addition, the time of the day of the toll event may be used since the toll rate may be different for peak hours, and non-peak hours.

Figure 9:
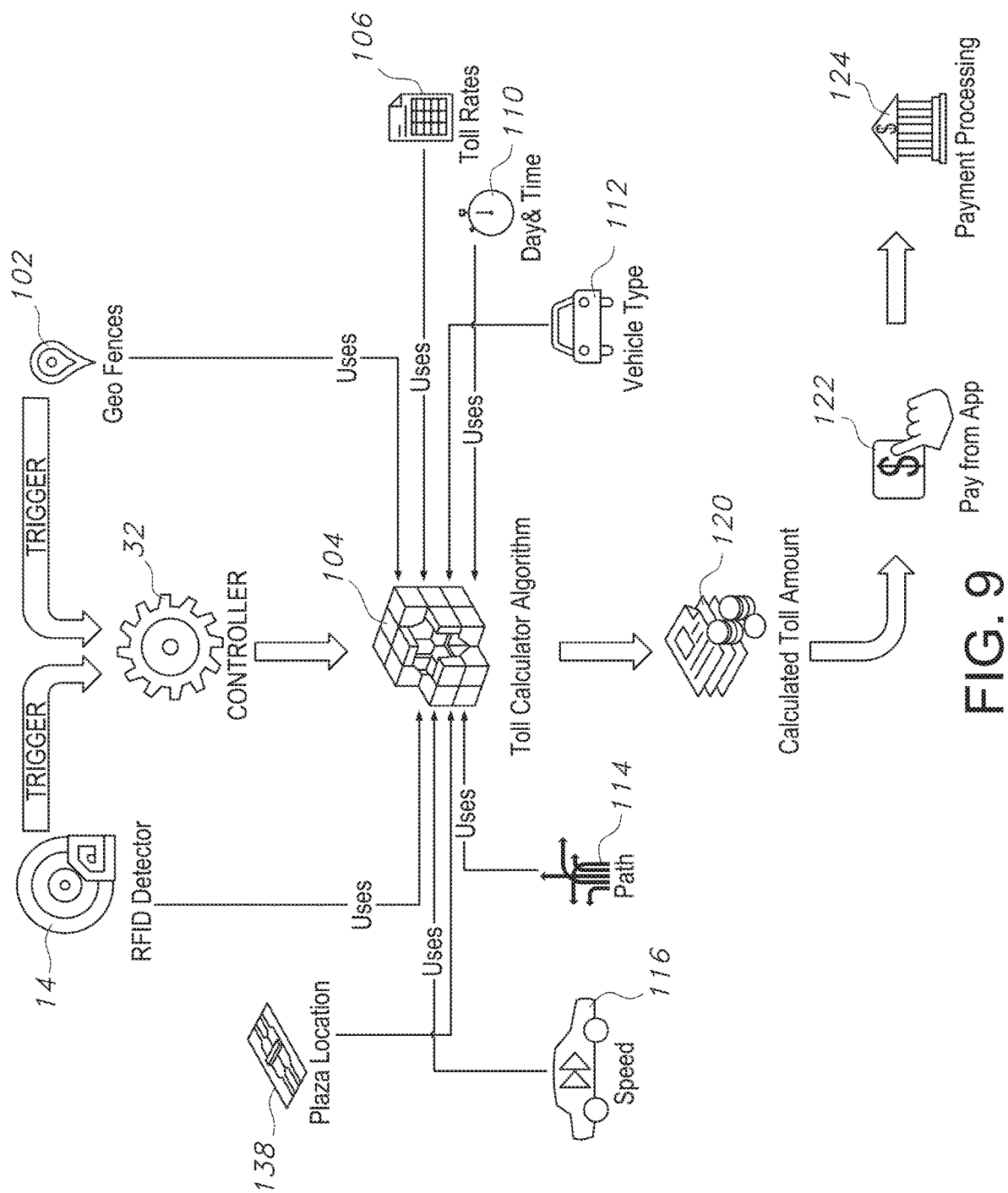
FIG. 9 is a rate calculation diagram.

The diagram shown in FIG. 9 further describes the rate calculation algorithm and its components. The algorithm can be triggered either by the sensor device's 14 detection of a RFID signal or by the passing of the vehicle 12 through a geofence 102. The information is relayed to the administrative system 10 via the mobile communication device 30. A processor of the system administrator 32 running the algorithm 104 receives inputs as to toll rates 108, time of day 110, vehicle type 112 vehicle path 114, vehicle speed 116, and toll plaza location 118. The algorithm generates a toll amount due 120 based on these parameters and exports the information to the user's mobile device running the software application 122. The user can than initiate the payment process 124. This can all be achieved in near real time, as there is no need wait for the toll authority to aggregate and push out the toll charge notification to the user. Relevant portions of the algorithm are set forth in FIGS. 10A-D.

The present system 10 may also be employed to track and pay parking fees. The system administrator 50 may be operably connected to a parking provider to integrate parking solutions into the software application to make the payment and expense submission process easier.

For parking, the user may push button 37 built into the sensor device 14. This action sends a signal to the processor 32 to automatically pair the sensor device 14 with the user's mobile communication device 30. The mobile device phone determines the user's precise geographic location using the onboard GPS capabilities. The mobile communication device 30 may then send a communication including the user's license plate and location to the system administrator's server. The user then confirms to start the parking meter. The server communicates the license plate and parking time to parking authorities. The parking authorities transmit to handheld units carried by parking enforcement personnel license plate information for citation whitelisting. Charges are then billed to user's payment provided previously during setup and registration. When parking time has expired, parking authorities transmit to parking enforcement personnel handheld devices license plate information for citation de-whitelisting.

Figure 11:
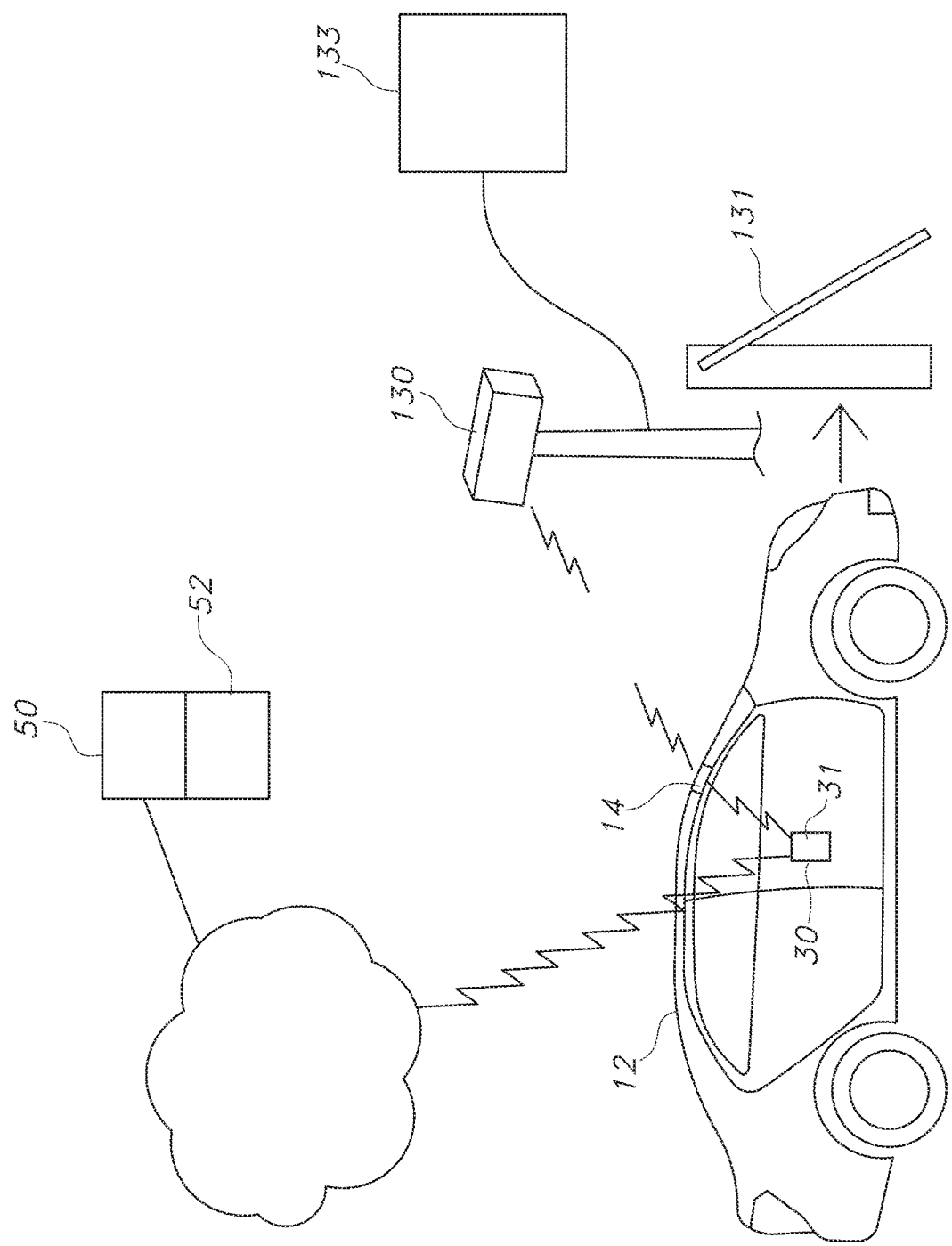
FIG. 11 is a schematic of a parking system.

In addition to metered parking, the system 10 and sensor device 14 of the present disclosure may be used for payments for parking garages and other paid parking locations may be transacted. With reference to FIG. 11, the sensor device 14 may be integrated with parking garages for access control and payment processing. This can be achieved using two embodiments. In a first embodiment:

1. Parking Garage installs an RFID reader 130 having specifications (frequency, protocol etc.) compatible with the sensor device 14. The reader 130 may be operably connected to a processor 133 and/or network.

2. User registers their sensor devices 14 with the application software that requires the user to register their vehicle with their parking garages.

3. At the parking garage entrance, the RFID reader 130 detects the sensor device 14, the driver's application software 31 is activated, and the driver initiates action within the software to authorize payment. Gates 131 are then raised allowing the driver to pass through.

While Exiting Parking Garage

4. Upon exit, the RFID reader detects the sensor device 14, the driver's software application is activated, and the system automatically matches the parking event to the specific driver.

Payment

5. The Garage system then sends the parking details to the system administrator 50 backend systems 52.

6. Once the parking event is matched, the software application notifies the user about the parking fees.

7. User then may use the software application to pay the parking fee. Exiting Parking Garage 8. Once successfully paid, the parking system allows the user to exit from the lot.

In an alternative embodiment, the following steps may be performed for parking area payments:

1. Parking Garage is installed with Bluetooth based access control system specification such that communication may be established with the sensor device 14.

While Entering Parking Garage

2. As the car installed with the sensor device 14 approaches the parking garage, the sensor device 14 sends identification data through BLE 3. The BLE reader at the garage barrier reads the identity of the sensor device 14, saves entry time etc. and lifts the barrier for the car to enter.

While Approaching Exit

4. As the car approaches exit barrier, the sensor device 14 sends identification data through BLE 5. The BLE reader at the garage barrier reads the identity of the sensor device 14, and notes the exit time Payment 6. The Garage system then sends the parking details to the toll administration backend systems.

7. Once the parking event is matched, the software application notifies the user about the Parking Fees.

8. User then may use the software applications payment process to pay the parking fee.

Exiting Parking Garage

9. The garage system then lifts the barrier for the car to exit.

The sensor device 14 can also be used for access control of the gated community backend systems. The gated community would install an RFID with the frequency, protocol, and other specifications compatible with the sensor device 14. A resident/employee registers their sensor device 14 with the gated community. At entrance, the RFID reader detects the sensor device 14 sensor and allows the resident to pass through.

As noted above, the software application also allows a user to pay the incurred charges, such as toll charges, through the software application. The software application will also display a receipt, and all previous usage and receipts. The system 10 calculates the toll charges based on a plurality of parameters using a toll collection algorithm discussed in detail above.

For example, the system 10 may also calculate parking rates based on parameters.

The system 10 may also be used for itemizing tolls receipt for expense reimbursement and provides a list of tolls which can then be submitted seamlessly to the traveler's employer or converted into an itemized receipt. The software can provide various details such as Toll plaza, Toll amount, Date, and Time. Toll event reports and analytics can be generated with plaza name, time and toll details. A map view of the incurred tolls can also be generated The software also permits integration with on-board telemetric devices such as Android Auto and Apple CarPlay.

The software application may include the various architectural components.

Geofences may Loaded/Reloaded of configured Geofences around Toll plazas and or other vendors such as parking lots.

Toll Plaza/Park lot Detection can be achieved by using the sensor device 14 through Detection of RFID. Alternatively, the detection can be achieved by matching of geofences.

Toll and parking fee calculations may be achieved through integration with the toll administration service backend to fetch the current toll rates for a detected toll plaza and calculate the payable toll.

The software may also permit the user to make a payment of the incurred toll or parking fees. Making a mobile payment of the incurred toll using exiting mobile payment protocols.

Figure 12:
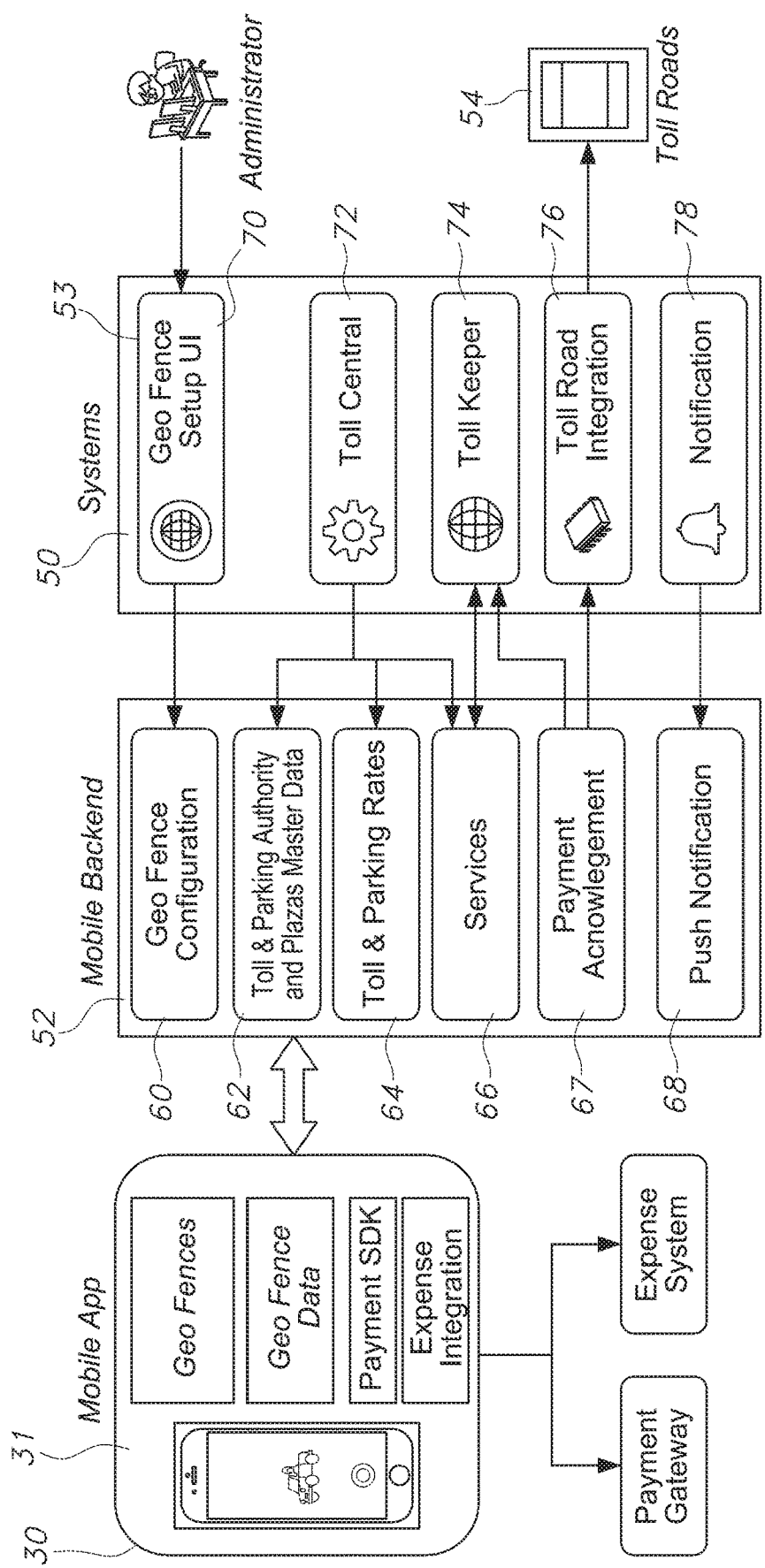
FIG. 12 is a schematic of a mobile software application architecture.

With reference to FIG. 12, a logical system architecture is shown. The software application running on the mobile communication device 30 and is wirelessly connected to a mobile backend 52 of the system administrator 50. The backend 52 may provide the software application with such information as geofence configurations 60, toll and parking authority and plazas master data 62, toll and parking rates 64, services 66, payment acknowledgments 67 and push notifications 68. The system administrator front end 53 may include a geofence setup 70 and toll calculator 72, and system administrator database 74, toll authority integration module 76, for integrating with the toll authorities 54, and a notification module 78. The mobile communication device 30 may also be able to interface with a payment gateway 80 to make payments and an expense system 80 for submitting expense reports.

Figure 13:
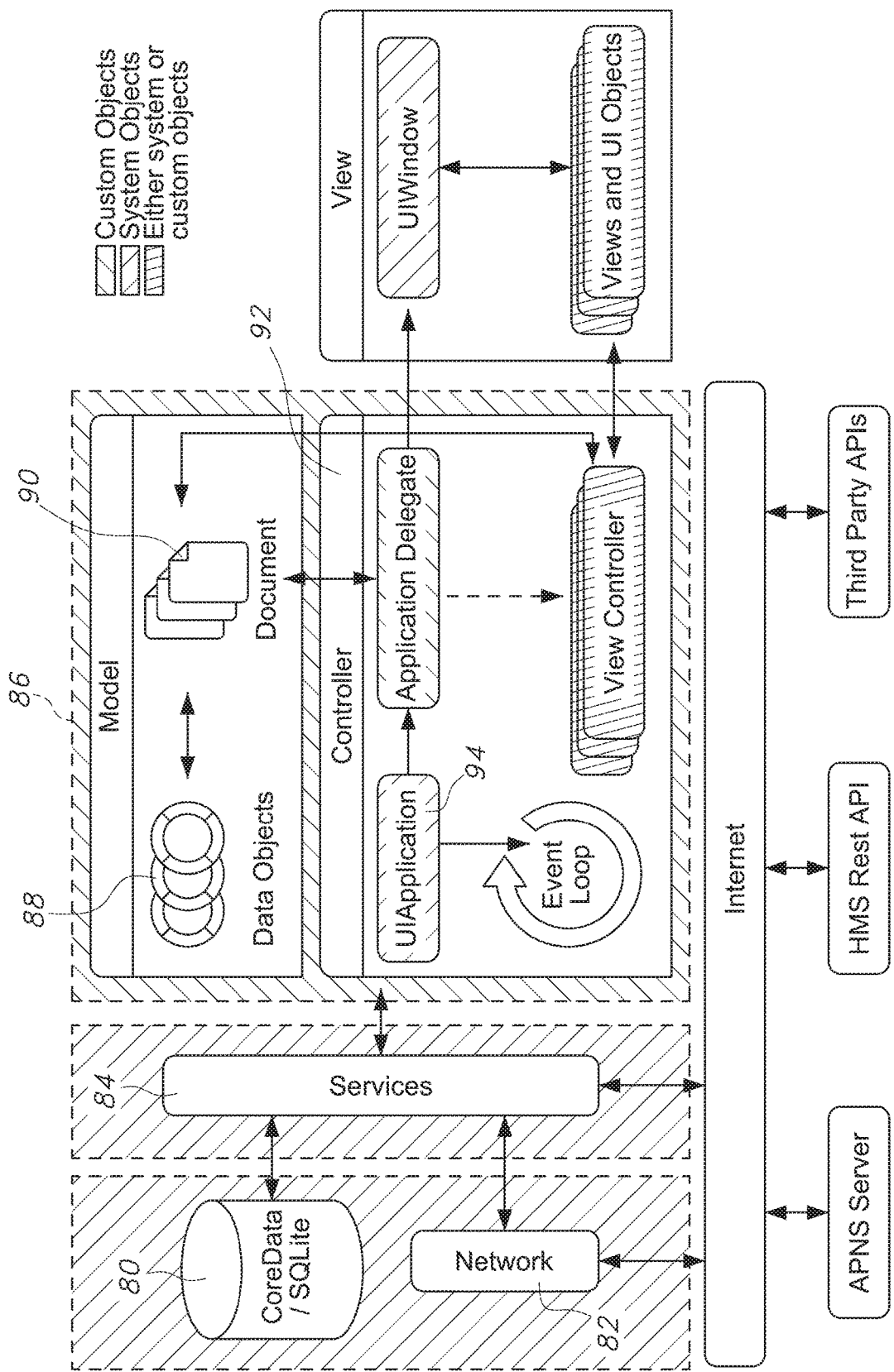
FIG. 13 is a schematic of a mobile based iOS architecture.
Figure 14:
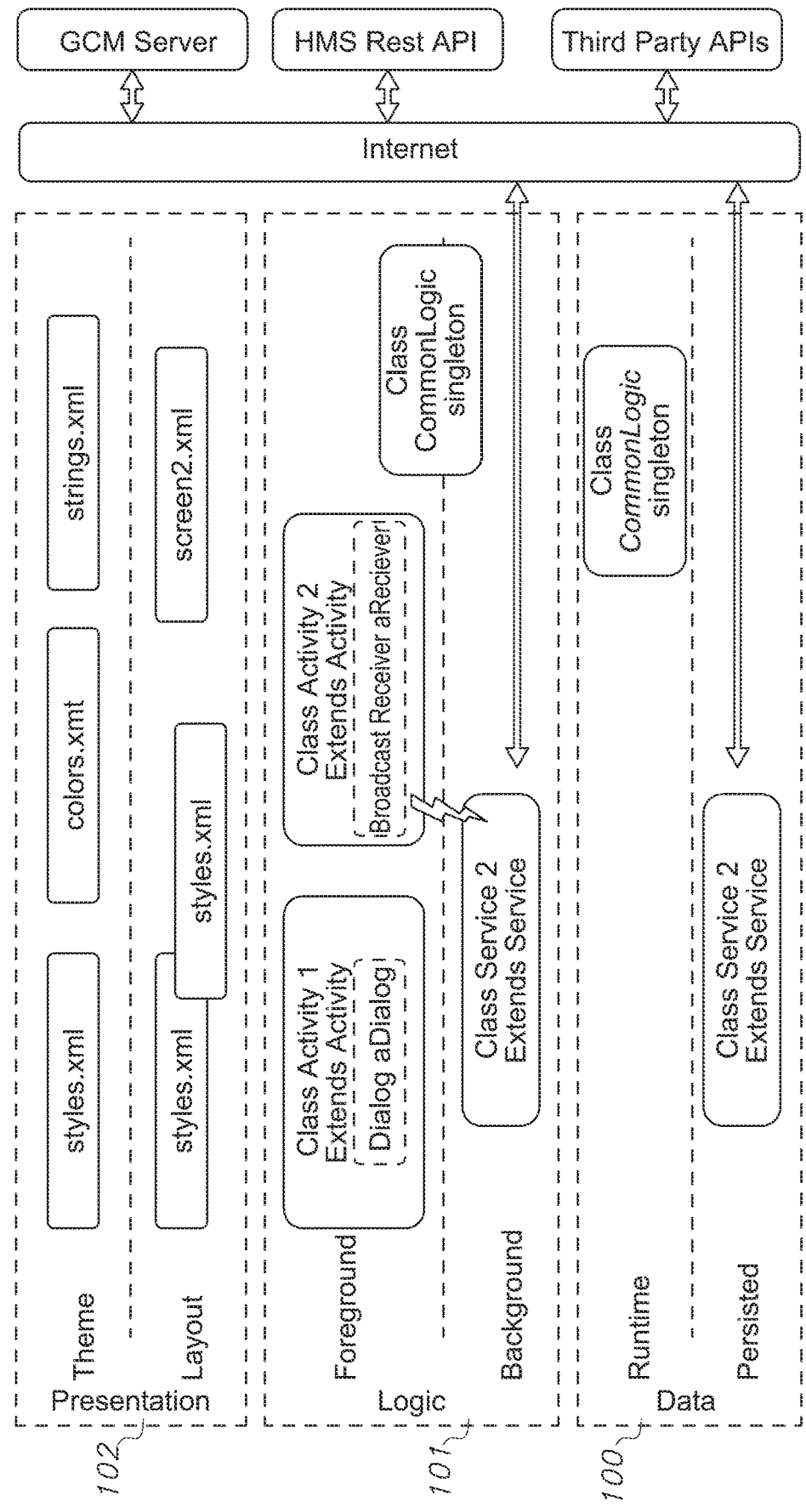
FIG. 14 is a schematic of a mobile based Android architecture.
Figure 15A:
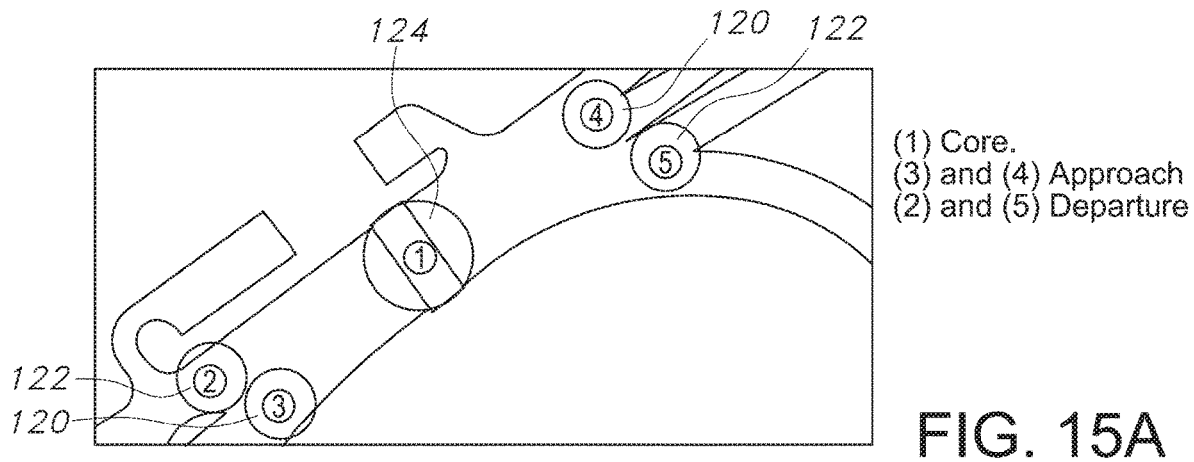
FIGS. 15A-D are schematics showing geofence locations.
Figure 15B:
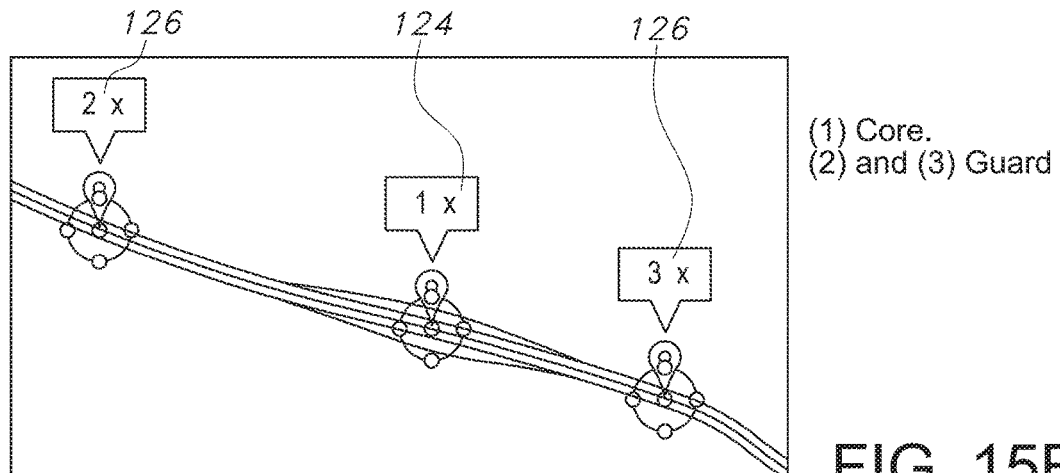
Figure 15C:
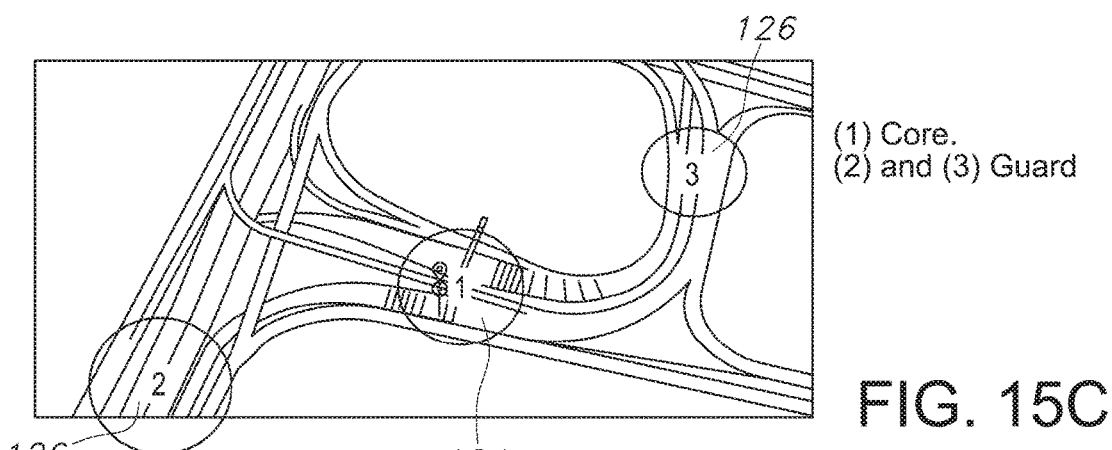
Figure 15D:
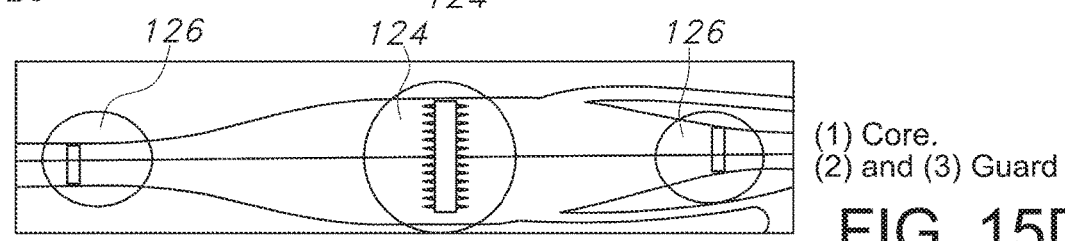

An ioS mobile architecture is shown in FIG. 13. The software may include a CoreData/SQLite 80 and Network 82 which integrates with Services 84. A Model 86 has data objects 88 and documents 90, and a controller 92. There is a UIApplication 94 operably connected to an Application Delegate and an event loop. A view controller integrates with a view module utilizing UIWindow and Views and UI Objects. The network and services modules connect to the internet. The internet may interface with an Apple Push Notification service (APNs) server and HMS Rest Application Programming Interface ("API") and Third part API's An Android® mobile architecture is shown in FIG. 14 and includes data 100, logic 101 and presentation 102 modules. The modules communicate with the internet. The internet may interface with an APNS server and HMS Rest API and Third part API's.

It is further contemplated that the software application may be integrated with onboard telematics. For example, the software application may be built as per the Apple CarPlay® standard. Alternatively, the software application may be designed to work with Android Auto®.

The present application also contemplates that the system 10 is able to determine a location of a vehicle with a high degree of precision. One manner of achieving this is using the sensor device 14 to receive the RF single emitted from a toll gantry or parking lot. The sensor device 14 may then communicate with the mobile communication device 30 using the BLE connection. The RF signal may contain a unique code identifying the toll and or parking structure. The system administrator can then determine the fee based on the location and the listing of toll or parking structures to determine the exact which of the vehicle.

An alternative manner of determining precise vehicle location is using geofences. This can be achieved without the use of the sensor device 14. The software application using the GPS features of the mobile communication device may determine the path taken by a vehicle as it passes through a series of geofences. Each path is a unique combination of one or more geofences. With reference to FIGS. 15A-D, there may be various types of geofences. One such type is an approach geofence 120, which uses a geofence only at the approach of an area. A second type is a departure geofence 122, which uses a geofence only at the departure of an area. A third type is a core geofence 124, which establishes a geofence at a toll plaza or middle of the toll path. A fourth type is a guard geofence 126, which may be located at an approach or departure of an area depending on direction.

The system administrator 50 may maintain in a database an active list of nearest geofences. To load or refresh, the mobile software application 31 sends the current geographical location information (latitude, longitude) to the system administrator backend. The system administrator uses a processor to create a list of the nearest geofences using a KD Tree based custom algorithm, for example, as set forth in FIG. 18.

The system 10 of the present disclosure can also provide mileage tracking information which can be useful for reimbursement of mileage fees. The mileage tracking functionality may use the GPS and Wifi (if enabled) features of the mobile communication device to plot the route and calculate mileage driven in a particular trip. The system 10 of this disclosure solves a particular problem that traditional geofenced-based mobile mileage tracking solutions have which is that these applications must remain "always on" so that the user can utilize other mobile functionality with the mileage tracker remaining in the background. "Always on" functionality, however, drains power from the mobile communication device 30 and leads to power consumption issues.

The present system 10 contemplates a solution, whereby the driver depresses a button 37 on the sensor device 14, which caused the sensor device 14 to communicate with the mobile communication device 30 to commence mileage tracking on the mobile software application. Periodically, at predetermined time intervals, the mobile communication device 30 may drop a "cookie crumb" on a server of the system administrator containing the mobile communication devices 30 geographic location. After or during the journey, the server calculates the path taken using the crumbs to reconstruct the vehicle's path. This approach significantly reduces the mobile communication device's inherent dependence on GPS-based tracking, and does not require use of the mobile communication device's location services at all.

An alternative battery saving strategy that may be employed is reducing the amount of polling. Generally geolocation based mileage software applications require "Always ON" setting, thus the application can poll GPS even when the software app is not running on the foreground. This has a negative impact on the battery consumption. The software application running on the mobile communication device 30 may optimize GPS polling rates, yet achieving the desired level of high accuracy. This will moderate the consumption of the battery. The battery usage for GPS will be minimized and optimized using a combination of multiple strategies as described below.

One strategy is to recognize when the mobile device is at rest. This can be achieved by monitoring whether the mobile communication device 30 has made a significant change in location. In this embodiment, the software application polls the GPS less frequently when the location is not changed significantly and increases the poll frequency as the location changes. The polling frequency may be directly proportional to the speed of change in location. This can be accomplished in a number of ways. While regularly polling for the GPS-reported location, the last few reported locations can be recorded. If the mobile communication device 30 device location has not changed for several minutes, polling can be done less frequently until a location change is detected. In addition, while polling for the GPS-reported location, the reported speed of the mobile communication device 30 can be analyzed. If a user is in a car, the speed is calculated to determine how frequently or infrequently to poll. The software application can increase polling frequency as a car accelerates to ensure that location accuracy is maintained between a few hundred feet and a couple of miles. The software application may include options to allow advanced users to adjust geolocation strategies. For example, users can specify times of day, polling frequency, and other attributes.

Some versions of mobile platforms typically share geolocation information at the operating system level. The software application may include a function in which it checks other applications that may be already polling for geolocation data. Using this shared passive source of geolocation information will minimize battery drain.

Even if the software application is causing significant battery drain, it is desirable that the software application not cause the phone to shut off. For example, the software application may check for location updates less frequently—or not at all—if the mobile device's battery level falls below 30%.

A switch on the software application may be utilized by a user to control the frequency of the GPS poll. A sample switch may work as described below.

| Mode | Mode Name | Details | Used When |
|---|---|---|---|
| 0 | OFF | GPS poll is off | When not using Software App. |
| 1 | ON SIGNAL | Poll GPS only when sensor device 14 sends a signal | When Software App used for Toll/Park Only. Mileage/Route tracking is disabled |
| 2 | ON NEED | Poll GPS On Need | Both Toll/Park and Mileage tracking enabled. Use along with previous three strategies |

| Mode | Mode Name | Details | Used When |
|---|---|---|---|
| 3 | ALWAYS | Poll GPS Always | Both Toll/Park and Mileage tracking enabled. Most battery consuming mode, provides highest level of accuracy. |

The software application running on the mobile device may have a report function that generates and displays all tolls incurred during a predefined period. The software application may also have a functionality to generate a trip report and track mileage. The trip report may be a visual representation of all events that occurred during a particular trip. The trip report will also show the toll, parking and the miles for the trip.

As noted above, existing transponder-based tolling does not provide real-time toll data feedback to the driver due to inherent technical limitations caused by batch-based processes and/or infrequent reconciliations between partnering toll authorities. However, it is desirable to provided real-time tolling to users, especially business travelers using their own transponders. Geofenced-based solutions are inaccurate, have power consumption issues, and simply will not work in many scenarios.

As a companion system for customers with their own transponder, the system 10 of this discloser can provide real-time tolling information to the driver separate and parallel to their traditional transponder toll activity because the sensor device 14 is activated at precisely the time of the toll fee-incurring incident.

More and more Toll roads are implementing dynamic toll pricing strategy. The system 10 of the present disclosure can accommodate dynamic pricing of the toll rates by the following steps.

1. Once the toll event is determined, the system administrator will check the master data if the toll road/plaza has dynamic pricing.

2. If there is no dynamic pricing, the system administrator will go ahead with the toll calculation and the normal flow as described earlier.

3. If there is dynamic pricing, the system administrator will save the toll event details including plaza name, time, day, lane etc. in a database.

4. The software application will alert the user about the dynamic pricing stating that toll calculation will be done offline and pass the details to the system administrator backend and wait for toll price data from toll authorities.

5. Once the toll data from toll authority arrives, the system administrator will match the event of dynamic toll, calculate the toll and then alert the user about the toll amount.

6. The user then may make payment and submit for expense reimbursement. The present system 10 can also allow users to conduct transactions with car rental companies. Currently, when the rental car customers check in their vehicle, there is no means to get their toll expense on as part of their invoice. With the present system 10 the rental customers can get the toll details about their toll expense during a trip when they return the car.

This can be achieved by the following steps:

1. As the car enters into the rental car area, the RFID reader at the entrance will read the sensor device 14 and identify the user.

2. The rental car agency backend then contacts the toll administrator backend 52 which includes servers and databases, for the toll details of the trip.

3. The toll administrator system 50 in response sends the toll data to the rental car agency.

4. The customer can thus get his toll details at the return desk.

In addition, the use of geo-fence data may provide enhanced check-in capabilities to the rental agencies.

The present system 10 can also be used for making payment in vehicle drive through retail transactions. A drive-through is a type of service provided by a retail establishment that allows customers to purchase products without leaving their cars. Drive-through services are typically offered in fast food restaurants, gas stations, groceries and coffee establishments. Processing payments for the drive-through has always been a challenge, whether it is cash, card or mobile tap based payments.

Figure 16:
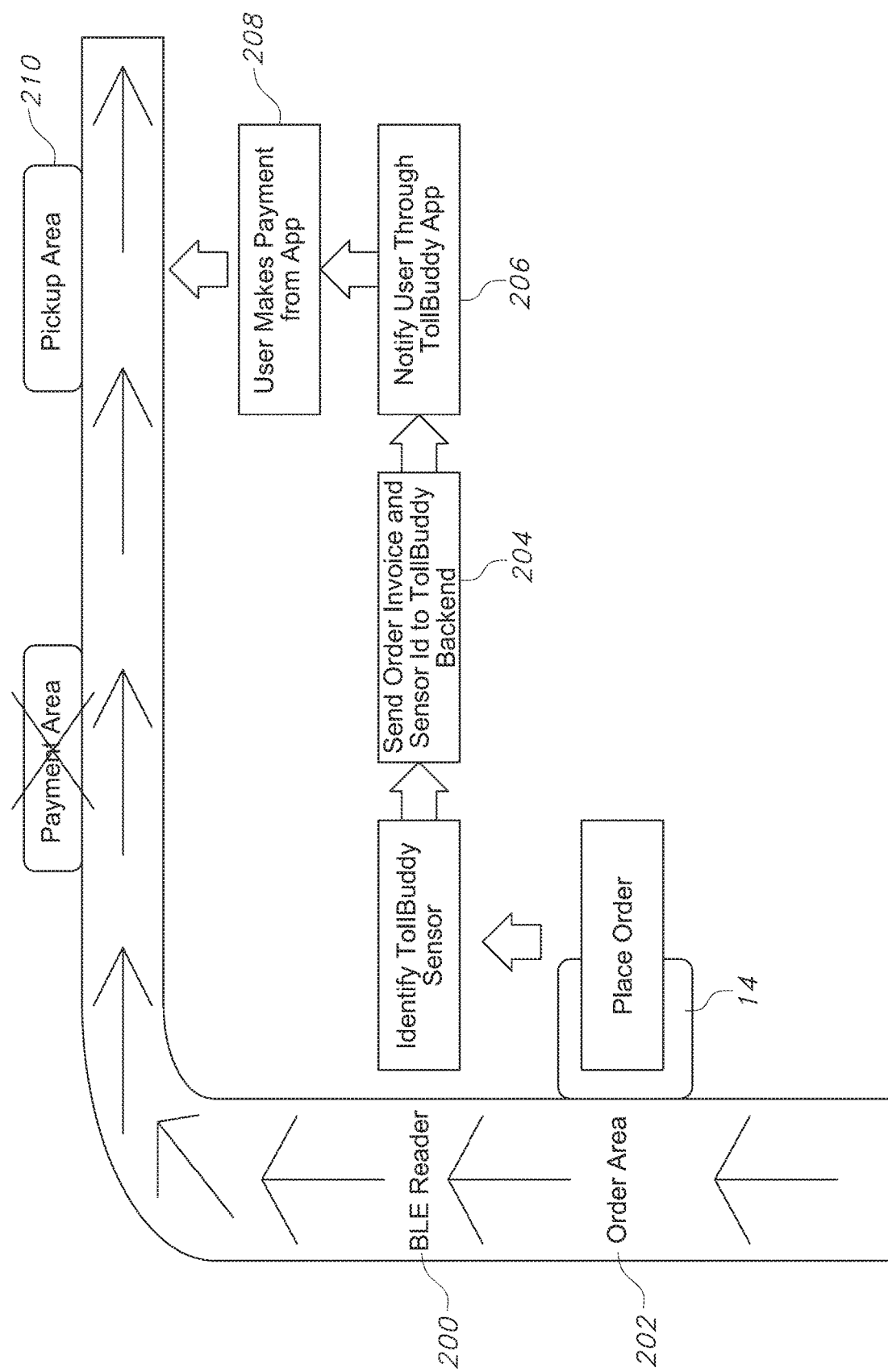
FIG. 16 is a diagram of a retail payment flow using the sensor device of the present disclosure.

With reference to FIG. 16, the retail establishment would have a reader such as a BLE reader 200 at an order area that can communicate with the sensor device 14 disposed in the vehicle. The retailer's scanner 200 identifies the user's on board sensor device 14 in an order area 202. After an order is placed, the retailer generates an order invoice 204 and that along with the sensor ID information is sent by the retailer to the system administrator 50 over an existing communication network. The system administrator's 50 system pushes out a signal to the user's mobile communication device 30 notifying the user of the charge 206. The user may then make the payment using their mobile device using the software application 208. The user can then pick up their goods in a pickup area 210.

Figure 17:
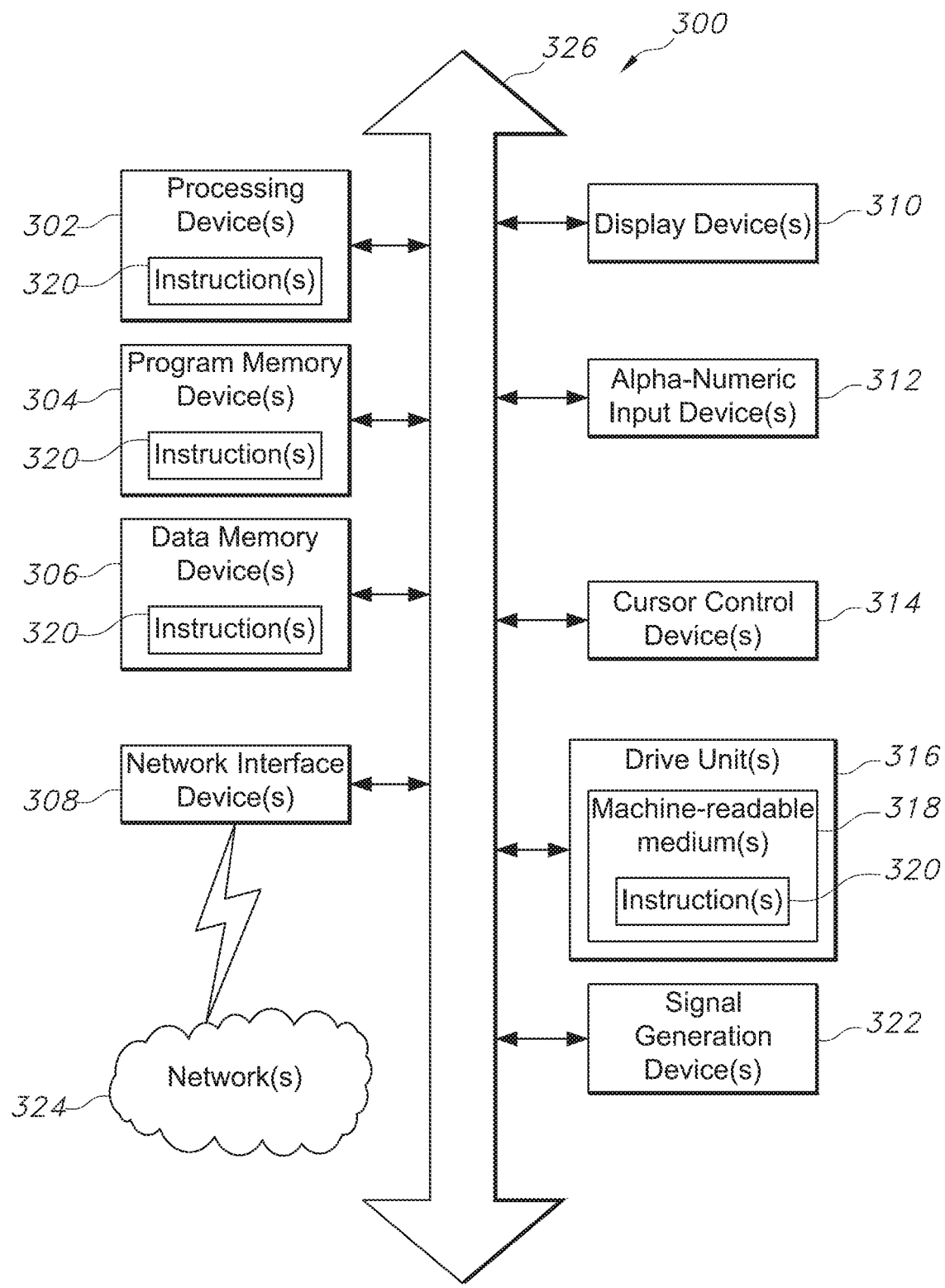
FIG. 17 is a block diagram showing a portion of an exemplary device in the form of a computing system that performs methods according to one or more embodiments.

As illustrated in FIG. 17, the system administrator 50 may include a computer system 300 may include a processor 302, e.g., a central processing module (CPU), a graphics-processing module (GPU), or both. Moreover, the computer system 300 may include a main memory 304 and a static memory 306 that can communicate with each other via a bus 326. As shown, the computer system 300 may further include a video display device 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive device 316, a signal generation device 322, such as a speaker or remote control, and a network interface device 308.

In a particular embodiment or aspect, as depicted in FIG. 17, the disk drive device 316 may include a computer-readable medium 318 in which one or more sets of instructions 320, e.g., software, can be embedded. Further, the instructions 320 may embody one or more of the methods or logic as described herein. In a particular embodiment or aspect, the instructions 320 may reside completely, or at least partially, within the main memory 304, the static memory 306, and/or within the processing device 302 during execution by the computer system 300. The main memory 304 and the processing device 302 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computer systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processing device. Further, in an exemplary, non-limited embodiment or aspect, implementations can include distributed processing, component/object distributed processing, and parallel processing. Alternatively, virtual computer system processing can be constructed to implement one or more of the methods or functionality as described herein.

It is also contemplated that a computer-readable medium includes instructions 320 or receives and executes instructions 320 responsive to a propagated signal, so that a device connected to a network 324 can communicate voice, video or data over the network 324. Further, the instructions 320 may be transmitted or received over the network 324 via the network interface device 308.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processing device or that cause a computer system to perform any one or more of the methods or operations disclosed herein.

In a particular non-limiting example, embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processing device. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium equivalent to a tangible storage medium. Accordingly, a tangible storage medium or distribution medium as listed herein, and other equivalents and successor media, in which the software implementations herein may be stored, are included herein., such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium Although the present specification describes components and functions implemented in the embodiments with reference to particular standards and protocols, the disclosed embodiment is not limited to such standards and protocols.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In the foregoing description of the embodiments, various features are grouped together in a single embodiment for streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

Although preferred embodiments of the present disclosure have been described herein with reference to the accompanying drawings, it is to be understood that the disclosure is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A sensor device for conducting electronic transactions from a vehicle comprising:
   a housing including an RFID circuit operably connected to an RFID antenna, a short range communication device, the RFID circuit and short range communication device operably connected to a processor, and a power supply;
   a memory operably connected to the processor;
   the sensor device wirelessly connectable to a mobile communication device via the short range communication device, the mobile communication device running a software application;
   the RFID antenna adapted to receive a wireless signal from a transmitter, and responsive to the wireless signal, the processor:
      attempting to establish a connection with the mobile communication device, wherein a user launches a software application on the mobile communication device and once launched the software application enters an always on state and waits to pair with the sensor device,
      if the connection is established, causing the short range communication device to wirelessly communicate with the mobile communication device to cause the mobile communication device to initiate a transaction, wherein to initiate a transaction the software application displays a payment feature and receives an authorization input from the user via the displayed payment feature in the software application, and
      if the connection is not established, storing transaction details in the memory, and causing the short range communication device to send the transaction details when the connection is established to cause the mobile communication device to initiate the transaction, and
   the RFID antenna further adapted to communicate with a gate to automatically operate the gate to allow a user to pass through when the transaction is authorized by the mobile communication device.

2. The sensor device as defined in claim 1, wherein the housing includes an input device operably connected to the processor, upon actuating the input device, the sensor device transmits a signal to cause the mobile device to provide a selection for the user to choose in order to initiate a function.

3. The sensor device as defined in claim 1, wherein the sensor has a unique identifier stored in memory, and the processor causes information specific to the frequency of the received wireless signal and the unique identifier to be transmitted to the mobile communication device.

4. The sensor device as defined in claim 1, wherein the short range communication device transmits a signal to the mobile device upon receipt of the wireless signal from the transmitter.

5. The sensor device as defined in claim 1, wherein the memory stores information specific to the received RFID signal and time.

6. The sensor device as defined in claim 1, wherein the housing includes a visual indicator.

7. The sensor device as defined in claim 6, wherein the visual indicator indicates the status of connection with the mobile communication device.

8. The sensor device as defined in claim 1, wherein the housing includes a switch to change the sensor between a high and low power mode.

9. The sensor device as defined in claim 1, wherein the short range communication device is a Bluetooth chip.

10. A system for making electronic transactions from a vehicle comprising:
    a sensor device including an RFID circuit operably connected to an RFID antenna, a short range communication device, the RFID circuit and short range communication device operably connected to a processor, and a power supply;
    a memory operably connected to the processor;
    the sensor device wirelessly connectable to a mobile communication device via the short range communication device, the mobile communication device running a software application;
    the RFID antenna adapted to receive a wireless signal from a transmitter, and responsive to the wireless signal, the processor:
       attempting to establish a connection with the mobile communication device, wherein a user launches a software application on the mobile communication device and once launched the software application enters an always on state and waits to pair with the sensor device,
       if the connection is established, causing the short range communication device to wirelessly communicate with the mobile communication device to cause the mobile communication device to initiate a transaction, wherein to initiate a transaction the software application displays a payment feature and receives an authorization input from the user via the displayed payment feature in the software application, and
       if the connection is not established, storing transaction details in the memory, and causing the short range communication device to send the transaction details when the connection is established to cause the mobile communication device to initiate the transaction; and
    the software application causing the mobile device to communicate wirelessly via a communication network with a system administrator to further the transaction and to send a signal to the mobile communication device that a transaction has occurred, and
    the RFID antenna further adapted to communicate with a gate to automatically operate the gate to allow a user to pass through when the transaction is authorized by the mobile communication device.

11. The system as defined in claim 10, wherein the system administrator transmits information to the mobile communication device responsive to a charge by the vendor.

12. The system as defined in claim 11, wherein the software application on the mobile device has a payment functionality to authorize payment of the charge.

13. The system as defined in claim 10, wherein the mobile communication device communicates GPS location information to the software and the location of the transmitter is determined using at least one geofence.

14. The system as defined in claim 10, wherein the RFID signal contains an identifier and the identifier is used to determine a location of the vehicle.

15. The system as defined in claim 13, wherein the GPS information is used to determine a specific lane in which a vehicle is traveling.

16. The system as defined in claim 10, wherein the transaction is passing through a tolling area, and software application notifies the user that a toll fee has been incurred.

17. The system as defined in claim 10, wherein the mobile communication device determines location information using GPS and the location information is transmitted to the system administrator.

18. The system as defined in claim 17, wherein the system administrator receives the location information and the system administrator processor generates a list of the nearest geofences.

19. The system as defined in claim 10, wherein the system administrator determines an amount to be charged using a plurality of factors including vehicle position, vehicle speed and day and time.

20. The system as defined in claim 11, wherein the transaction is passing through a parking area, and software application notifies the user that a parking fee has been incurred.

21. A method of conducting a transaction from a vehicle comprising:
   providing within a vehicle a sensor device including a processor and an RFID circuit operably connected to an RFID antenna, a short range communication device operably connected to the processor, and a power supply;
   providing a mobile communication device running a software application, the sensor device being wirelessly connected to the mobile communication device, wherein a user downloads the software application to the mobile communication device, wherein the user opens the software application to set up an account and register the sensor device, and wherein registration of the sensor device is accomplished by the user entering an identification number in a prompted field or by pairing the sensor device to the communication device;
   the sensor device receiving a wireless signal from a transmitter of a provider;
   responsive to the wireless signal, the sensor device:
      attempting to establish a connection with the mobile communication device,
      if the connection is established, wirelessly communicating with the mobile communication device to cause the mobile communication device to initiate a transaction, and
      if the connection is not established, storing transaction details, and wirelessly communicating the transaction details when the connection is established to cause the mobile communication device to initiate the transaction;
   the software application causing the mobile device to communicate wirelessly via a communication network with a system administrator to complete a transaction; and
   system administrator sending a signal to the mobile communication device indicating that the transaction has occurred,
   wherein the sensor device is further to communicate with a gate to automatically operate the gate to allow a user to pass through when the transaction is authorized by the mobile communication device.

22. The method as defined in claim 21 wherein, the provider is a toll authority and signal is transmitted from a tolling station and the signal has an identification element, the sensor device communicating the identification element of the signal to the mobile communication device.

23. The method as defined in claim 22 wherein, the mobile communication device transmits the sensor device's identification identifier and the identification element of the provider's signal to the system administrator.

24. The method as defined in claim 21 wherein, the system administrator determines a payment amount for the transaction and communicates that amount to the mobile device which displays the amount to a user.

25. The method as defined in claim 24 wherein, the system administrator communicates with the provider and initiates the payment of the payment amount.

26. The method as defined in claim 21 wherein, the mobile device has a GPS location device and the mobile communication device transmits the location of the vehicle to the system administrator, the system administrator using the location information to determine the payment amount.

27. The method as defined in claim 21 wherein, the wireless signal is transmitted by a toll station, and the system administrator determines a toll fee responsive to the information communicated by the mobile device and the system administrator generates a communication to the mobile communication device including the toll fee, and the toll fee being displayed.

28. The method as defined in claim 21 wherein, the mobile communication device communicates GPS location in formation to the software and the location of the provider is determined using at least one geofence.

29. The method as defined in claim 21 wherein, the system administrator receives the location information and the system administrator processor generates a list of the nearest geofences.

* * * * *